US012730797B2

(12) United States Patent
Takahashi et al.

(10) Patent No.: US 12,730,797 B2
(45) Date of Patent: Sep. 8, 2026

(54) SYSTEM AND NODE USING BLOCKCHAIN TECHNOLOGY FOR SENDING LEDGER INFORMATION BETWEEN GROUPS OF LEDGERS

(71) Applicant: KYOCERA Corporation, Kyoto (JP)

(72) Inventors: Yoshihiro Takahashi, Yokohama (JP); Hiroyuki Yamashita, Fuchu (JP); Satoko Ishihara, Yokohama (JP); Haeseung Jung, Yokohama (JP); Hideo Nishiuchi, Yokohama (JP); Masashi Fujisawa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/754,877

(22) Filed: Jun. 26, 2024

(65) Prior Publication Data

US 2024/0346015 A1 Oct. 17, 2024

Related U.S. Application Data

(63) Continuation of application No. PCT/JP2022/046234, filed on Dec. 15, 2022.

(30) Foreign Application Priority Data

Dec. 28, 2021 (JP) ................................ 2021-214070
Dec. 28, 2021 (JP) ................................ 2021-214085

(51) Int. Cl.
*G06F 16/23* (2019.01)

(52) U.S. Cl.
CPC ................................ *G06F 16/2379* (2019.01)

(58) Field of Classification Search
CPC ........... G06F 16/2379; G06F 9/50; G06F 9/52
See application file for complete search history.

(56) References Cited

U.S. PATENT DOCUMENTS 11,271,800 B1 * 3/2022 Rizvi .................... H04L 49/901
11,461,777 B2 10/2022 Wu et al.
2017/0236120 A1 * 8/2017 Herlihy ................ G06Q 20/065 705/67
2019/0188697 A1 6/2019 Wu et al.
2019/0188698 A1 6/2019 Wu et al.
2019/0188711 A1 * 6/2019 Wu ...................... G06Q 20/227
2019/0238486 A1 * 8/2019 Zizka .................... H04L 9/0825
2019/0287200 A1 * 9/2019 Schuler ................ G06Q 50/265
2020/0111040 A1 * 4/2020 Nagai ................ G06Q 10/0637
2020/0201560 A1 * 6/2020 Yang ..................... G06F 3/0655
2021/0374112 A1 12/2021 Nagai et al.
(Continued)

FOREIGN PATENT DOCUMENTS

JP 2009-272802 A 11/2009
JP 2018-067108 A 4/2018
(Continued)

*Primary Examiner* — Hares Jami
(74) *Attorney, Agent, or Firm* — Studebaker Brackett PLLC

(57) ABSTRACT

A system using blockchain technology includes a plurality of nodes forming a network having a hierarchical structure and each managing a ledger. Each of the plurality of nodes is located, based on a performance of a corresponding one of the plurality of nodes, in a layer corresponding to the performance among a plurality of layers in the hierarchical structure.

9 Claims, 20 Drawing Sheets

(56) References Cited

U.S. PATENT DOCUMENTS

| | | | | |
|---|---|---|---|---|
| 2023/0054245 | A1* | 2/2023 | Wright | G06F 16/27 |
| 2023/0179431 | A1* | 6/2023 | Tang | H04L 9/50<br>713/185 |

FOREIGN PATENT DOCUMENTS

| | | | | |
|---|---|---|---|---|
| JP | 2021-508111 | A | 2/2021 | |
| JP | 2021-189638 | A | 12/2021 | |
| WO | WO-2021082824 | A1 * | 5/2021 | G06Q 20/405 |

* cited by examiner

FIG. 17
START NODE JOIN
MAKE JOIN APPLICATION TO NODE PARTICIPATING IN GROUP
S101
IS PRE-CONFIRMATION OK IN QUARANTINE NETWORK?
S102
NO
REJECT GROUP JOIN APPLICATION
S103
YES
PERMIT JOIN?
S104
NO
REJECT GROUP JOIN APPLICATION
S105
YES
DETERMINE LAYER PERMITTED NODE IS TO JOIN, BASED ON PERFORMANCE PARAMETER
S106
DETERMINE PARTICIPATING GROUP, BASED ON SLEEP TIME
S107
ADD PERFORMANCE PARAMETER OF JOINED NODE TO LEDGER OF PARTICIPATING GROUP
S108
DETERMINE PRIORITY
S109
END NODE JOIN

SYSTEM AND NODE USING BLOCKCHAIN TECHNOLOGY FOR SENDING LEDGER INFORMATION BETWEEN GROUPS OF LEDGERS

RELATED APPLICATIONS

The present application is a continuation based on PCT Application No. PCT/JP2022/046234, filed on Dec. 15, 2022, which claims the benefit of Japanese Patent Application No. 2021-214070 filed on Dec. 28, 2021, and Japanese Patent Application No. 2021-214085 filed on Dec. 28, 2021. The content of which is incorporated by reference herein in their entirety.

TECHNICAL FIELD

The present disclosure relates to a system, a node, and a program using blockchain technology.

BACKGROUND OF INVENTION

In recent years, blockchain technology has been attracting attention. Blockchain technology has the advantage of system outages not occurring since an autonomous distributed network, to be specific, a Peer to Peer (P2P) network is formed by a plurality of nodes.

Blockchain technology has a mechanism in which each node manages transaction history in the P2P network as a ledger. Such a mechanism is also referred to as distributed ledger technology. When a transaction occurs in one node, calculation (verification) processing is performed in all participating nodes. This provides a mechanism that leaves a correct transaction history that is very difficult to tamper with even when fraud occurs in a participating node or the participating node does not operate normally.

Patent Document 1 describes a system in which a P2P network is divided into a plurality of hierarchical networks and transaction data is managed independently for each network in order to solve the problem of strained capacity in nodes due to bloat caused by the transaction history held in each node (ledger). In this system, when a transaction partner is present in a network of the system, transaction data is shared and stored only in the network of the system.

CITATION LIST

Patent Literature

Patent Document 1: JP 2018-67108 A

SUMMARY

In a first aspect, a system uses blockchain technology. The system includes a plurality of nodes configured to form a network having a hierarchical structure and to each manage a ledger. Each of the plurality of nodes is located, based on a performance of a corresponding one of the plurality of nodes, in a layer corresponding to the performance among a plurality of layers in the hierarchical structure.

In a second aspect, a node forms a network having a hierarchical structure in a system using blockchain technology. The node includes a storage configured to store a ledger, a communicator configured to communicate with another node in the network, and a controller configured to determine a layer in which a target node is to be located in the network, in accordance with a performance of the target node. The target node is the node or the other node.

In a third aspect, a program causes a node forming a network having a hierarchical structure in a system using blockchain technology to perform processing of storing a ledger, processing of communicating with another node in the network, and processing of determining a layer in which a target node is to be located in the network, in accordance with a performance of the target node. The target node is the node or the other node.

In a fourth aspect, a system uses blockchain technology. The system includes a network including a plurality of groups including a first group formed by one or more nodes configured to manage a first ledger and a second group formed by one or more nodes configured to manage a second ledger different from the first ledger. The one or more nodes belonging to the second group are configured to notify the first group of ledger information related to the second ledger. Each of the one or more nodes belonging to the first group is configured to manage the ledger information as a part of the first ledger.

In a fifth aspect, a node belongs to a first group formed by one or more nodes configured to manage a first ledger in a system using blockchain technology. The node includes a storage configured to store the first ledger, a communicator configured to receive ledger information related to a second ledger different from the first ledger from a second group formed by one or more nodes configured to manage the second ledger, and a controller configured to manage the ledger information as a part of the first ledger.

In a sixth aspect, a program causes a node belonging to a first group formed by one or more nodes configured to manage a first ledger in a system using blockchain technology to perform processing of storing the first ledger, processing of receiving ledger information related to a second ledger different from the first ledger from a second group formed by one or more nodes configured to manage the second ledger, and processing of managing the ledger information as a part of the first ledger.

DESCRIPTION OF EMBODIMENTS

In the blockchain technology, each node is assumed to have sufficient performance (specification), and when a transaction occurs in any one node, calculation is required of all nodes. Therefore, even a node in which transactions do not occur frequently is required to perform calculation frequently when a node in which transactions occur frequently participates in the same group.

Therefore, it is difficult to apply the existing blockchain technology to a device having poor performance such as a small battery capacity, a low calculation capability, or a small storage capacity, for example, an Internet of Things (IoT) device such as a sensor device. In the technique described in Patent Document 1, since such a difference in performance between nodes is not taken into consideration, it is difficult to cause a device having low performance to participate as a node.

In one aspect, the present disclosure can apply the blockchain technology even to a node having low performance.

As in the technique described in Patent Document 1, it is considered that update frequency and increase in size of a ledger can be suppressed by grouping nodes in a P2P network and individually managing a ledger for each group. However, in such a method, since the content of the ledger of each group is not linked to the ledger of another group, there is a problem in that reliability in the blockchain technology may be decreased.

In another aspect, the present disclosure can suppress a decrease in reliability while suppressing an update frequency and increase in size of a ledger when applying the blockchain technology.

Embodiments are described with reference to the drawings. In the description of the drawings, the same or similar parts are denoted by the same or similar reference signs.

Overview of Blockchain Technology

Prior to describing a system according to an embodiment, a general blockchain technology is described with reference to FIGS. 1 and 2.

Figure 1:
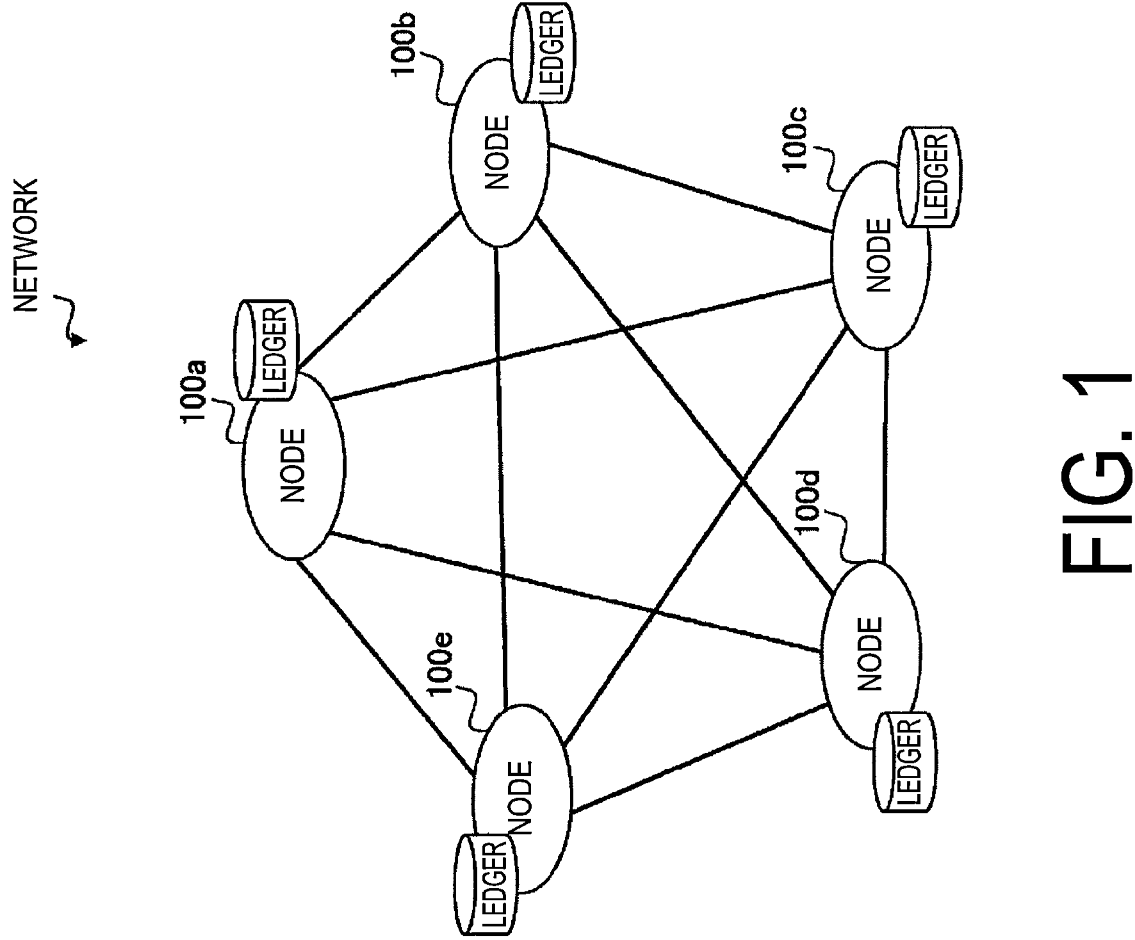
FIG. 1 is a diagram illustrating a configuration example of a network in a general blockchain technology.

FIG. 1 is a diagram illustrating a configuration example of a network in the general blockchain technology. In the following description of the drawings, lines connecting nodes represent communication connections between the nodes. Such a communication connection is also referred to as a direct communication connection.

In the blockchain technology, an autonomous distributed network, to be specific, a P2P network is formed by a plurality of nodes 100. The nodes 100 are communicably connected to each other. Communication between the nodes 100 may be performed via a public communication network and/or a local communication network. Note that, although a total of five nodes 100*a* to 100*e* are illustrated in FIG. 1, the number of nodes 100 is not limited to five. Each node 100 is a device having at least a communication function and an arithmetic processing function, such as a personal computer (PC), for example. In the general blockchain technology, each node 100 is assumed to have sufficient performance (specification).

Each node 100 manages a history of transactions in the network as a ledger. When a transaction occurs in one node 100 (for example, the node 100*a*), calculation (verification) processing is performed in all participating nodes (the nodes 100*a* to 100*e*). This provides a mechanism that leaves a correct transaction history that is very difficult to tamper with even when fraud occurs in a participating node 100 or the participating node 100 does not operate normally.

Figure 2:
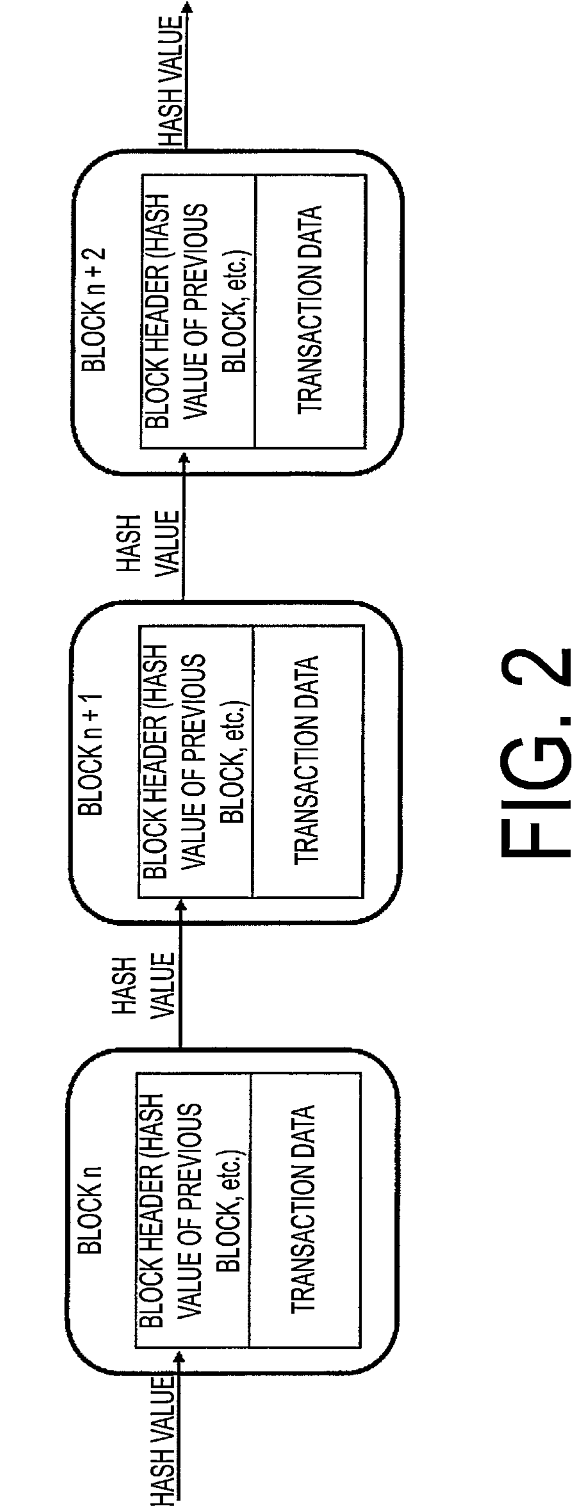
FIG. 2 is a diagram illustrating a configuration example of a ledger managed by each node.

FIG. 2 is a diagram illustrating a configuration example of a ledger managed by each node 100.

Each node 100 stores a record of transactions occurring in the network in a block. One block includes a block header which is a header part and a transaction data part for storing data of at least one transaction. The block header stores a hash value or the like calculated from a block generated immediately before. For example, a block header of a block n+1 stores a hash value calculated from a block n and the like. In this way, the ledger has a data structure in which the generated blocks are connected in a chain form along a time series.

The block header may further include a block height indicating a corresponding block number and a nonce that is a value used to calculate a hash value. For example, the plurality of nodes 100 calculate a corresponding hash value by using the value of the nonce changed accordingly and the transaction data or the like, and the node 100 that finds a hash value satisfying a specific condition distributes a generated block to another node. Then, all of the nodes 100 on the network verify the hash value of the block and recognize the block as a new block, whereby the block is determined.

Note that the transaction may include, for example, remittance or settlement of money, points, or the like, or occurrence of communication or the like. In this case, the transaction data stored in the blocks of the ledger may be data of remittance or settlement. The transaction data may be communication data. The transaction may include participation or removal of a node in the network, or the like. In this case, the transaction data stored in the blocks of the ledger may be data (parameter) of the node 100. The transaction may include an update of the ledger.

In the embodiment, an example is mainly assumed in which the transaction data stored in the block of the ledger is the data (parameter) of the node 100. Management of such data (parameter) of the node 100 with the ledger makes easy to guarantee that the node 100 in the network is a genuine device.

Hierarchically Structured Network

A network having a hierarchical structure (hereinafter referred to as a "hierarchically structured network") 10 according to the embodiment is described with reference to FIG. 3.

As described above, in the blockchain technology, each node 100 is assumed to have sufficient performance, and when a transaction occurs in any one node 100, all of the nodes 100 perform calculation (verification). Therefore, it is difficult to apply the blockchain technology to a device having poor performance such as a small battery capacity, a low calculation capability, or a small storage capacity, for example, an IoT device such as a sensor device.

In the embodiment, a hierarchically structured network 10 is formed, in which each node 100 is located in a layer according to the performance of the node 100. By adopting the hierarchical structure, an upper layer may be a layer with a high calculation frequency (that is, the update frequency of the ledger) and a lower layer may be a layer with a low calculation frequency, suppressing the calculation frequency of the lower layer. A device having high performance may be located in the upper layer and a device having low performance may be located in the lower layer, which makes it possible to participate in the hierarchically structured network 10 of the blockchain independently of whether the performance is good or bad.

Figure 3:
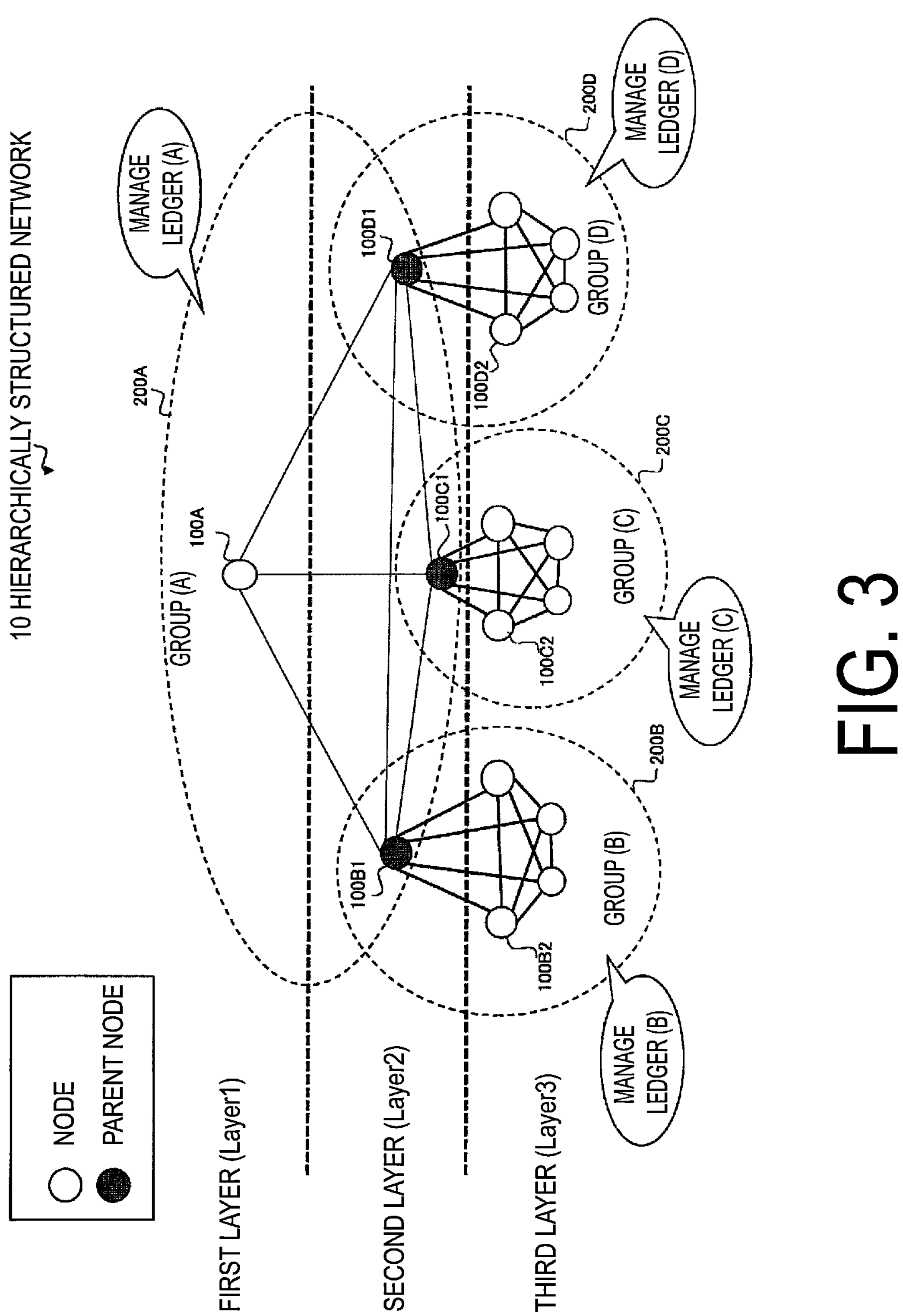
FIG. 3 is a diagram illustrating a configuration example of a hierarchically structured network according to an embodiment.

FIG. 3 is a diagram illustrating a configuration example of a network according to the embodiment. The hierarchically structured network 10 has a hierarchical structure including three layers of a first layer to a third layer. Although the embodiment mainly describes an example using three layers, the number of layers may be two, or four or more. In the example illustrated in FIG. 3, the first layer is the uppermost layer and the third layer is the lowest layer.

In such a hierarchically structured network 10, each node 100 manages a ledger. Each node 100 is located in a layer corresponding to the performance of the node 100 among the three layers, based on the performance of the node 100. Here, the performance of the node 100 refers to at least one selected from the group consisting of a calculation capability (for example, processor capability), a storage capacity (for example, a memory size), and a battery capacity. The performance of the node 100 may include a sleep time to be described later. For example, when a new node joins, the new node or another node determines a layer in which the new node is to be located, based on the performance of the new node. The new node may be a node that is already located in any one of the three layers in the hierarchically structured network 10. The node may be relocated in a layer different from the layer in which the node is currently located, in response to the performance of the node changing. For example, when a usage rate of a processor included in the node is limited, the performance of the node is degraded. Therefore, the node may be relocated in a layer lower than the layer in which the node is currently located.

Each node 100 located in the first layer and each node 100 located in the second layer form an upper layer group. FIG. 3 illustrates an example in which the node 100 belonging to the first layer is only a node 100A, but a plurality of nodes 100 may be located in the first layer.

In the example of FIG. 3, the nodes 100 located in the second layer are three nodes 100B1, 100C1, and 100D1. Each node 100 belonging to a group (A) 200A, which is the upper layer group, manages a ledger (A), which is an upper layer ledger.

Each node 100 located in the second layer and each node 100 located in the third layer form a lower layer group that manages lower layer ledgers. For example, a device having high performance is located in the first layer (or the second layer), and a device having lower performance than the former device is located in the third layer. That is, the node 100 belonging to the lower layer group has lower performance than the node 100 belonging to the upper layer group.

FIG. 3 illustrates an example in which a total of three lower layer groups including groups (B) to (D) are formed. However, the number of lower layer groups is not limited to three, and the number of lower layer groups may be one or four or more.

One node 100B1 located in the second layer and a plurality of nodes 100B2 located in the third layer belong to the group (B). Each node 100B belonging to the group (B) manages a ledger (B), which is a lower layer ledger. The node 100B1 belongs to both the group (A) and the group (B) and manages both the ledger (A) and the ledger (B). The node 100B1 is a parent node of the group (B). The node 100B2 belongs only to the group (B), and thus manages only the ledger (B).

In the same and/or similar manner, one node 100C1 located in the second layer and a plurality of nodes 100C2 located in the third layer belong to the group (C). Each node 100C belonging to the group (C) manages a ledger (C), which is a lower layer ledger. The node 100C1 belongs to both the group (A) and the group (C) and manages both the ledger (A) and the ledger (C). The node 100C1 is a parent node of the group (C). The node 100C2 belongs only to the group (C), and thus manages only the ledger (C).

In the same and/or similar manner, one node 100D1 located in the second layer and a plurality of nodes 100D2 located in the third layer belong to the group (D). Each node 100D belonging to the group (D) manages a ledger (D), which is a lower layer ledger. The node 100D1 belongs to both the group (A) and the group (D) and manages both the ledger (A) and the ledger (D). The node 100D1 is a parent node of the group (D). The node 100D2 belongs only to the group (D), and thus manages only the ledger (D).

In each of the groups (A) to (D), the nodes 100 are communicably connected to each other, hold and manage the common ledger in the group, and perform processing the same as and/or similar to a known blockchain in the group. By such grouping, the number of nodes in each group can be reduced, and thus the increase in size of the ledger can be suppressed.

In general, a node 100 having low performance (for example, an IoT device such as a sensor device) has a transaction occurrence frequency lower than that of a node 100 having high performance. For example, the node 100 having low performance intermittently performs communication in order to reduce power consumption and enters a sleep state while not performing communication, and no transaction occurs during the sleep time.

In the group (A), which is the upper layer group formed by the nodes 100 having high performance, the ledger (A) may be more frequently updated and more likely to have an increased data amount than in the lower layer group. On the other hand, in the group (B) formed by the nodes 100 having low performance, the update frequency of the ledger (B) can be suppressed and an increase in the data amount of the ledger (B) can be suppressed. In the same and/or similar manner, in the group (C) formed by the nodes 100 having low performance, the update frequency of the ledger (C) can be suppressed and an increase in the data amount of the ledger (C) can be suppressed. In the same and/or similar manner, in the group (D) formed by the nodes 100 having low performance, the update frequency of the ledger (D) can be suppressed and an increase in the data amount of the ledger (D) can be suppressed.

However, although the update frequency and the increase in size of the ledgers can be suppressed by individually managing the ledger for each group, the reliability in the blockchain technology may decrease when the contents of the ledgers of each group and another group are not linked to each other. In the embodiment, the contents of the ledgers between groups can be linked to each other to suppress the update frequency and the increase in size of the ledgers, and suppress the decrease in reliability.

Specifically, the hierarchically structured network 10 includes a plurality of groups including a first group formed by one or more nodes 100 managing a first ledger and a second group formed by one or more nodes 100 managing a second ledger different from the first ledger. In the hierarchically structured network 10, the node(s) 100 belonging to the second group notify the first group of ledger information related to the second ledger. Each node 100 belonging to the first group manages the notified ledger information as a part of the first ledger. This can link the contents of the ledgers between the groups.

Here, the first group is one of the upper layer group and the lower layer group, and the second group is the other of the upper layer group and the lower layer group. That is, the ledgers are linked between groups having a direct communication connection. On the other hand, the ledgers are not linked between lower layer groups, i.e. between groups not having a direct communication connection. This allows the ledgers to be managed independently between the lower layer groups with update of a ledger in one lower layer group not affecting a ledger in another lower layer group.

Ledger Management Method

A Ledger Management Method According to the Embodiment is Described with Reference to FIGS. 4 to 6.

Figure 4:
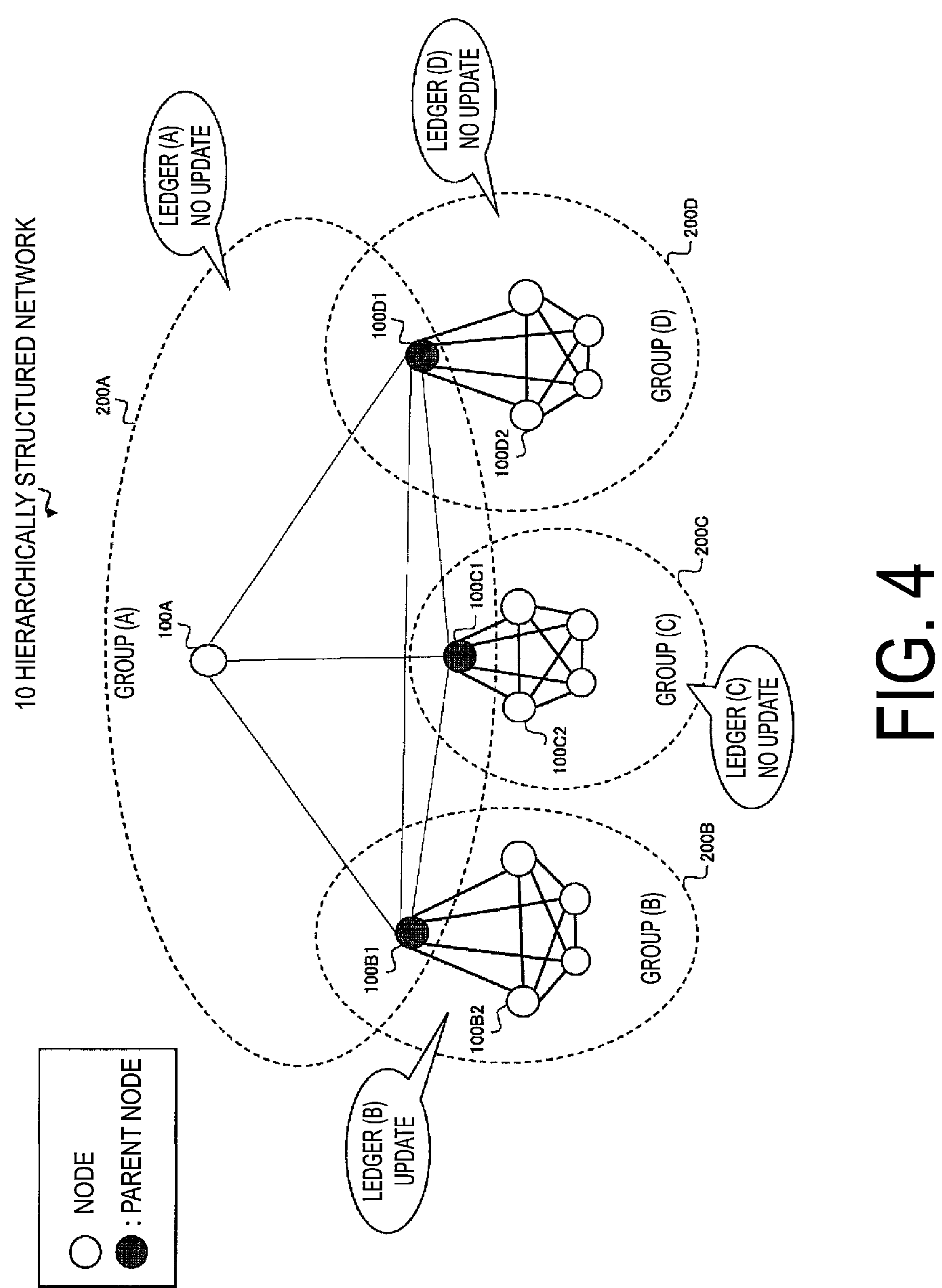
FIG. 4 is a diagram illustrating a ledger management method according to the embodiment.

As illustrated in FIG. 4, each node 100 belonging to the upper layer group managing the upper layer ledger updates the upper layer ledger in accordance with each of the transactions in the upper layer group and the transactions in the lower layer group.

For example, the nodes 100 belonging to the group (A) 200A, which is the upper layer group, (nodes 100A, 100B1, 100C1, and 100D1) not only update the ledger (A), which is the upper layer ledger, in accordance with transactions in the group (A) 200A, but also update the ledger (A) in accordance with transactions in any of the lower layer groups (group (B) 200B, group (C) 200C, or group (D) 200D). FIG. 4 illustrates an example in which the nodes 100 belonging to the group (A) 200A (nodes 100A, 100B1, 100C1, and 100D1) update the ledger (A) in response to the ledger (B) in the group (B) 200B being updated.

The update frequency of the upper layer ledger in the upper layer group is the same as and/or similar to the update frequency of the ledger in the general hierarchically structured network 10 (see FIG. 1) having no hierarchical structure. The transactions in the lower layer groups (group (B) 200B, group (C) 200C, and group (D) 200D) are reflected on the ledger (A), which is the upper layer ledger, so that the reliability of the blockchain technology can be maintained.

Figure 5:
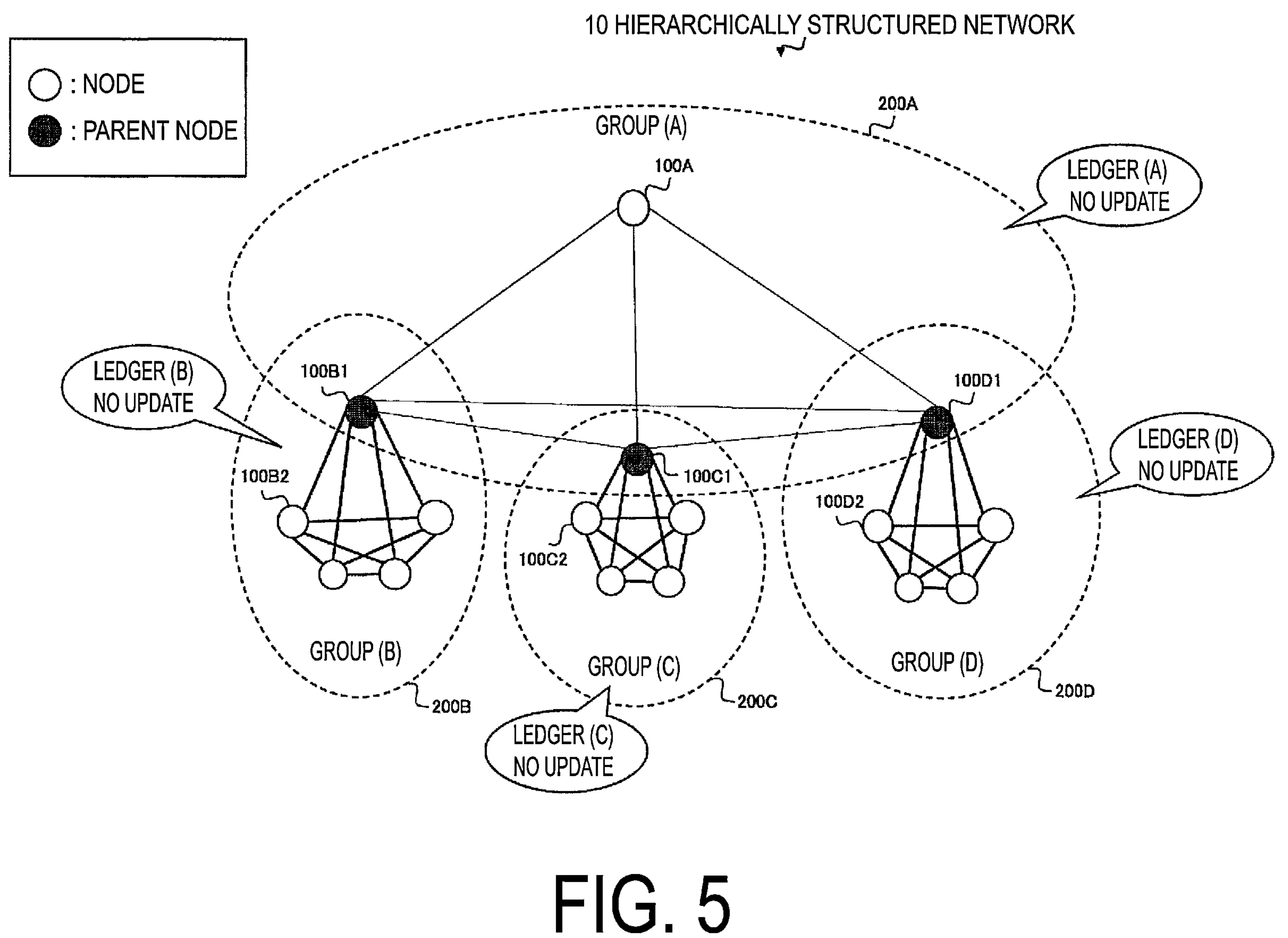
FIG. 5 is a diagram illustrating a ledger management method according to the embodiment.

On the other hand, as illustrated in FIG. 5, the nodes 100 belonging to the lower layer group managing the lower layer ledgers update, without updating the lower layer ledgers in accordance with the transactions in the upper layer group, the lower layer ledgers in accordance with the transactions in the lower layer groups. That is, even when the upper layer ledger is updated, the lower layer ledgers are not updated. This can reduce the update frequency of the lower layer ledgers in the lower layer groups.

For example, the nodes 100B belonging to the group (B) 200B, which is the lower layer group, (nodes 100B1 and 100B2) update the ledger (B), which is the lower layer ledger, in accordance with transactions in the group (B) 200B, but do not update the ledger (B) in accordance with the transactions in the group (A) 200A. In the same and/or similar manner, the nodes 100C belonging to the group (C) 200C, which is the lower layer group, (nodes 100C1 and 100C2) update the ledger (C), which is the lower layer ledger, in accordance with transactions in the group (C) 200C, but do not update the ledger (C) in accordance with the transactions in the group (A) 200A. In the same and/or similar manner, the nodes 100D belonging to the group (D) 200D, which is the lower layer group, (nodes 100D1 and 100D2) update the ledger (D), which is the lower layer ledger, in accordance with transactions in the group (D) 200D, but do not update the ledger (D) in accordance with the transactions in the group (A) 200A.

As illustrated in FIG. 4, each node 100 belonging to the lower layer group managing the lower layer ledger does not update the lower layer ledger in accordance with transactions in the other lower layer groups. For example, even when the ledger (B) is updated in the group (B) 200B, which is the lower layer group, the group (C) 200C and the group (D) 200D, which are other lower layer groups, do not update the ledger (C) and the ledger (D). This can reduce the update frequency of the lower layer ledgers in the lower layer groups.

As described above, when a transaction occurs in a lower layer group, the upper layer ledger is updated in the upper layer group, but the ledgers do not need to be updated in the other lower layer groups. Further, even when a transaction occurs in the upper layer group, the lower layer ledgers in the lower layer groups do not need to be updated. This can reduce the whole amount of calculation. Therefore, the blockchain technology can be applied even to a device having a low calculation processing capability and/or a small memory capacity.

Figure 6:
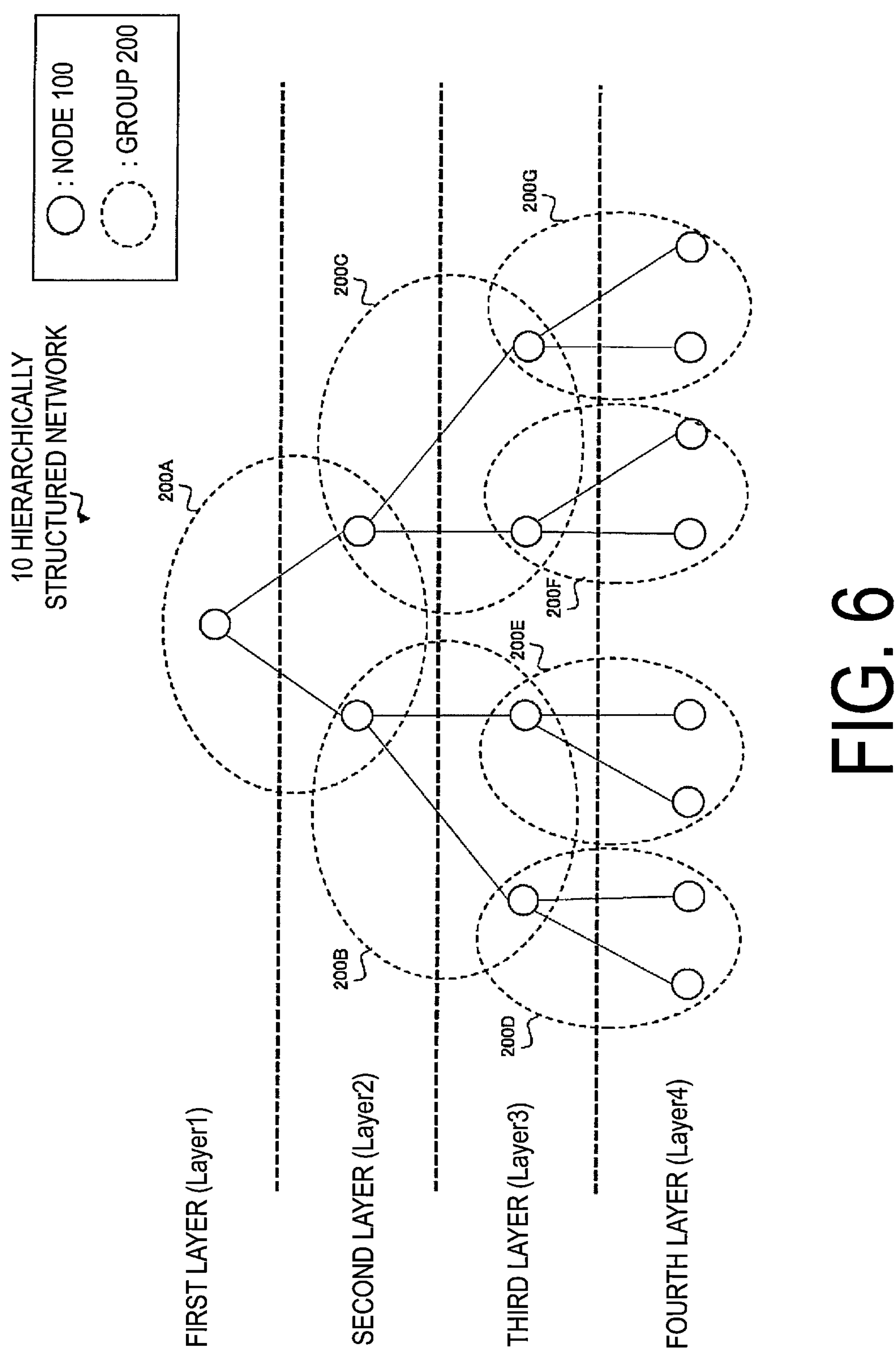
FIG. 6 is a diagram for explaining an effect of reducing an amount of calculation when the hierarchically structured network according to the embodiment is compared with a general network configuration.

FIG. 6 is a diagram for explaining an effect of reducing an amount of calculation when the hierarchically structured network 10 according to the embodiment is compared with a general network configuration (see FIG. 1). Here, an example of adopting a hierarchical structure of a binary tree is illustrated. It is assumed that there are n (n≥4) nodes 100 and the transaction occurrence frequencies in the respective nodes 100 are equivalent to each other.

As illustrated in FIG. 6, the node 100 in an uppermost layer (Layer1) is required to calculate transactions of all nodes, and thus has the calculation frequency the same as that in the general blockchain technology. On the other hand, each node 100 in the lowest layer is required to perform calculation only for transactions of the group in which the node 100 itself participates. In the case of the binary tree, the number of nodes in each group is 3, so the calculation frequency can be suppressed to 3/n.

For example, when layers other than the uppermost layer have a two-layer structure (n=7), the calculation can be reduced by about 38% of the total. When the layers other than the uppermost layer have a three-layer structure (n=15), the calculation can be reduced by about 61% of the total. When n is large enough (limit→∞), the calculation can be reduced by about 67% of the total. Specifically, the lower the layer, the more the calculation frequency can be reduced. Therefore, the amount of communication and the number of times of calculation can be suppressed as compared with those in the general blockchain technology. Thus, even a device having insufficient performance for participation in a case of using the general blockchain technology can utilize the blockchain technology.

Note that in the network configuration illustrated in FIG. 6, each two groups having a direct communication connection configure the upper layer group and the lower layer group. For example, based on the group 200B, the group 200A is the upper layer group, and each of the group 200D and the group 200E is the lower layer group. Based on the group 200D and the group 200E, the group 200B is the upper layer group. In the same and/or similar manner, based on the group 200C, the group 200A is the upper layer group, and each of the group 200F and the group 200G is the lower layer group. Based on the group 200F and the group 200G, the group 200C is the upper layer group.

Link Between Upper Layer Ledger and Lower Layer Ledger

With Reference to FIGS. 7 to 10, the Link Between the Upper Layer Ledger and the Lower Layer Ledger According to the Embodiment is Described.

Figure 7:
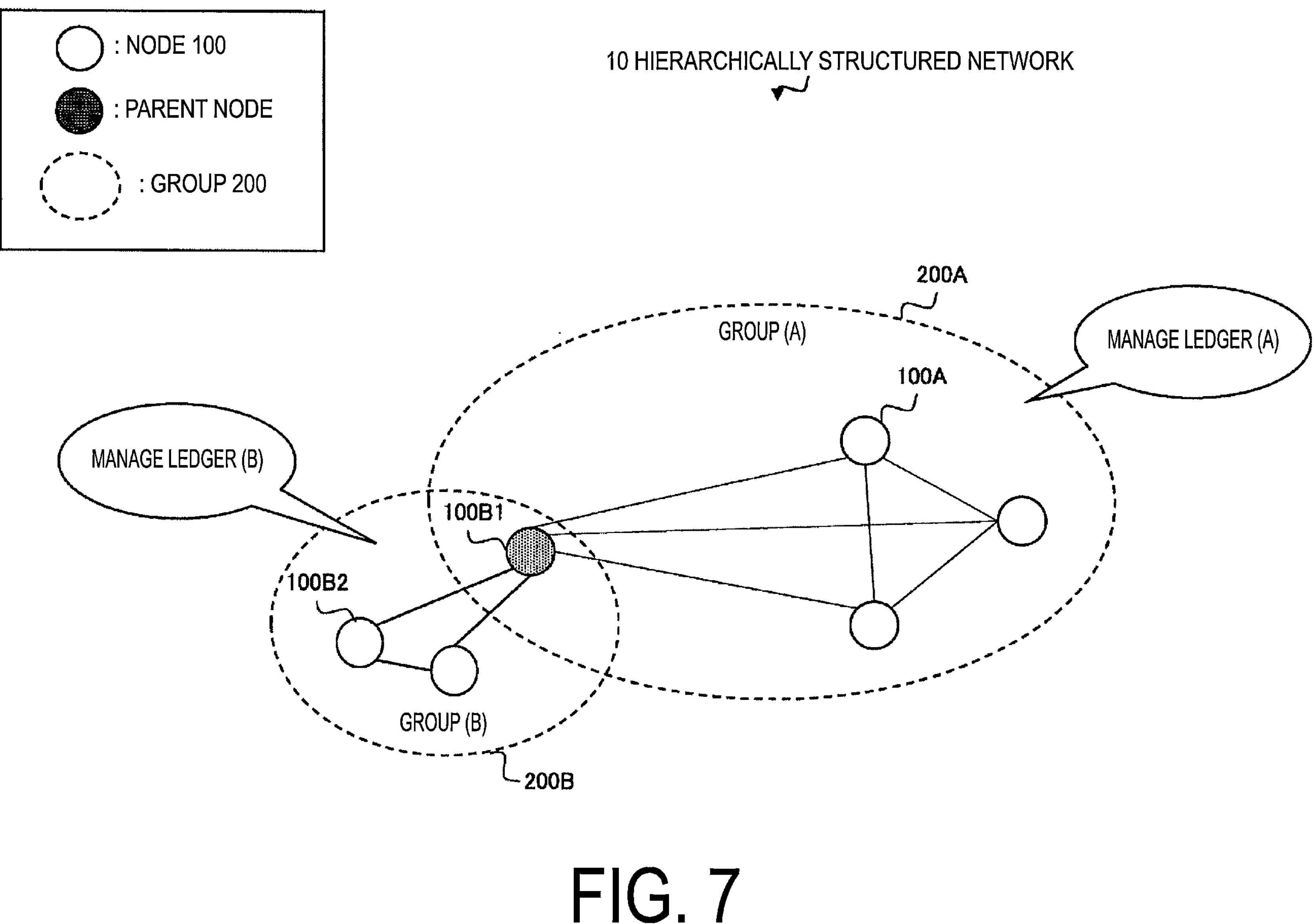
FIG. 7 is a diagram for explaining a link between an upper layer ledger and a lower layer ledger according to the embodiment.

As illustrated in FIG. 7, the hierarchically structured network 10 is configured by the group (A) 200A formed by the nodes 100 (nodes 100A and 100B1) managing the ledger (A) and the group (B) 200B formed by the nodes 100 (nodes 100B1 and 100B2) managing the ledger (B).

The node 100 belonging to the group (A) 200A notifies the group (B) 200B of the ledger information related to the ledger (A). For example, the node 100B1 belonging to the group (A) 200A notifies another node 100B2 in the group (B) 200B of the ledger information related to the ledger (A). Each node 100 belonging to the group (B) 200B (nodes 100B1 and 100B2) manages the ledger information as a part of the ledger (B). In this way, each node 100 belonging to the lower layer group managing the lower layer ledger manages the ledger information related to the upper layer ledger as a part of the lower layer ledger. This can link the lower layer ledger to the upper layer ledger.

For example, the ledger information managed as a part of the ledger (B), which is the lower layer ledger, may include a chain ID indicating the ledger (A), which is the upper layer ledger. The ledger information managed as a part of the ledger (B) may include a hash value calculated from a block of the ledger (A). The ledger information managed as a part of the ledger (B) may include a block height indicating a block number of the ledger (A). Here, each node 100 belonging to the group (B) (nodes 100B1 and 100B2) may store the ledger information in a header part (block header) of a block of the ledger (B). This makes easy to specify the ledger (A) and search for which block of the ledger (A) is linked to at the time of verification in the group (B) 200B, and to transmit information such as a verification result from the group (B) 200B to the group (A) 200A.

On the other hand, each node 100 belonging to the group (B) 200B notifies the group (A) 200A of the ledger information related to the ledger (B). For example, the node 100B1 belonging to the group (B) 200B notifies another node 100A in the group (A) 200A of the ledger information related to the ledger (B). Each node 100 belonging to the group (A) 200A (nodes 100B1 and 100A) manages the ledger information as a part of the ledger (A). In this way, each node 100 belonging to the upper layer group managing the upper layer ledger manages the ledger information related to the lower layer ledger as a part of the upper layer ledger. This can link the upper layer ledger to the lower layer ledger.

For example, the ledger information managed as a part of the ledger (A), which is the upper layer ledger, may include a chain ID indicating the ledger (B), which is the lower layer ledger. The ledger information managed as a part of the ledger (A) may include a hash value calculated from a block of the ledger (B). The ledger information managed as a part of the ledger (A) may include a block height indicating a block number of the ledger (B). Here, each node 100 belonging to the group (A) (nodes 100B1 and 100A) may store the ledger information in a transaction data part of a block of the ledger (A). As a result, the ledger (B), even having a low update frequency and having a length not long enough, is associated with the sufficiently long ledger (A), so that a decrease in a strength of security can be suppressed. For example, fork protection of the ledger (B) can be easy to confirm at the time of verification in the group (A) 200A. That is, a wrong (fake) blockchain is not branched, and a correct ledger (B) can be easy to confirm. For the ledger (B) having the low update frequency and having the length not long enough, when all blocks included in the ledger (B) are tampered with before a new block is added to the ledger (B), the node managing the ledger (B) cannot recognize that the ledger (B) has been tampered with. Even in such a case, linking the ledger (A) and the ledger (B) allows the node managing the ledger (A) to recognize that the ledger (B) has been tampered with, so that a decrease in the strength of security can be suppressed.

Figure 8:
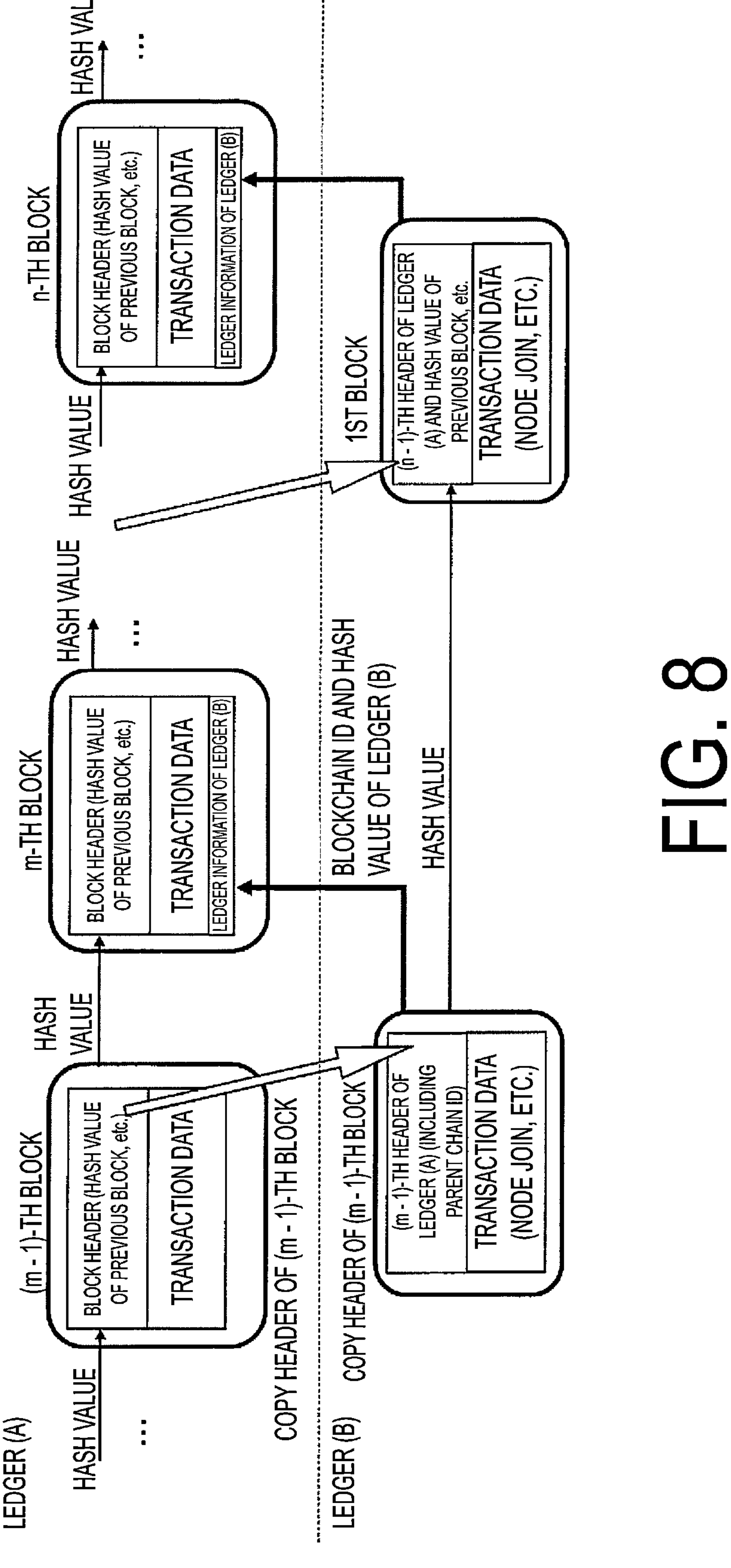
FIG. 8 is a diagram illustrating an operation example when a group according to the embodiment is formed and thereafter a new group is formed below the former group.

FIG. 8 is a diagram illustrating an operation example when the group (A) 200A is formed and thereafter the group (B) 200B is newly formed below the group (A) 200A. Here, a node belonging to the group (A) 200A is referred to as a node (A), and a node belonging to the group (B) 200B is referred to as a node (B). However, since the parent node belongs to both the group (A) 200A and the group (B) 200B, the operation of FIG. 8 may be performed in the same node (parent node).

As illustrated in FIG. 8, first, the node (A) managing the ledger (A) updates the ledger (A) by adding the (m−1)-th block to the ledger (A). The (m−1)-th block includes a block header including a hash value calculated from the previous block of the ledger (A) and transaction data for at least one transaction in the group (A) 200A. The block header may further include a chain ID (parent chain ID) indicating the ledger (A) and/or a block height indicating (m−1), which is a block number of the block.

Second, the group (B) 200B is formed. The node (B) managing the ledger (B) updates (generates) the ledger (B) by adding an initial block in the ledger (B), that is, the 0-th block to the ledger (B). The 0-th block includes in a block header part thereof a block header of a block of the ledger (A) which is the latest at the time when the 0-th block is added, that is, a block header of the (m−1)-th block of the ledger (A) as the ledger information related to the ledger (A). The 0-th block also includes in a transaction data part thereof transaction data for at least one transaction in the group (B) 200B. Here, the transaction may be, for example, a node joining the group (B) 200B. The transaction data may include a node parameter for the joined node.

Third, the node (A) managing the ledger (A) updates the ledger (A) by adding the m-th block to the ledger (A). The m-th block includes in a block header part thereof a hash value calculated from the (m−1)-th block, which is the previous block of the ledger (A). The m-th block also includes in a transaction data part thereof transaction data for at least one transaction in the group (A) 200A and ledger information related to the ledger (B). The ledger information includes a hash value calculated from a block of the ledger (B) which is the latest at the time when the m-th block is added, that is, the 0-th block of the ledger (B), and a chain ID indicating the ledger (B). The ledger information may further include a block height indicating 0, which is a block number of the 0-th block.

Fourth, the node (B) managing the ledger (B) updates the ledger (B) by adding the 1st block in the ledger (B) to the ledger (B). The 1st block includes in a block header part thereof a block header of a block of the ledger (A) which is the latest at the time when the 1st block is added, as the ledger information related to the ledger (A). The 1st block includes in the block header part thereof a hash value calculated from the 0-th block of the ledger (B). The 1st block also includes in a transaction data part thereof transaction data for at least one transaction in the group (B) 200B. Here, the transaction may be, for example, a node joining the group (B) 200B. The transaction data may include a node parameter for the joined node.

Fifth, the node (A) managing the ledger (A) updates the ledger (A) by adding the n-th block to the ledger (A). The n-th block includes in a block header part thereof a hash value calculated from the (n−1)-th block, which is the previous block of the ledger (A). The n-th block also includes in a transaction data part thereof transaction data for at least one transaction in the group (A) 200A and ledger information related to the ledger (B). The ledger information includes a hash value calculated from a block of the ledger (B) which is the latest at the time when the n-th block is added, that is, the 1st block of the ledger (B), and a chain ID indicating the ledger (B). The ledger information may further include a block height indicating 1, which is a block number of the 1st block.

Figure 9:
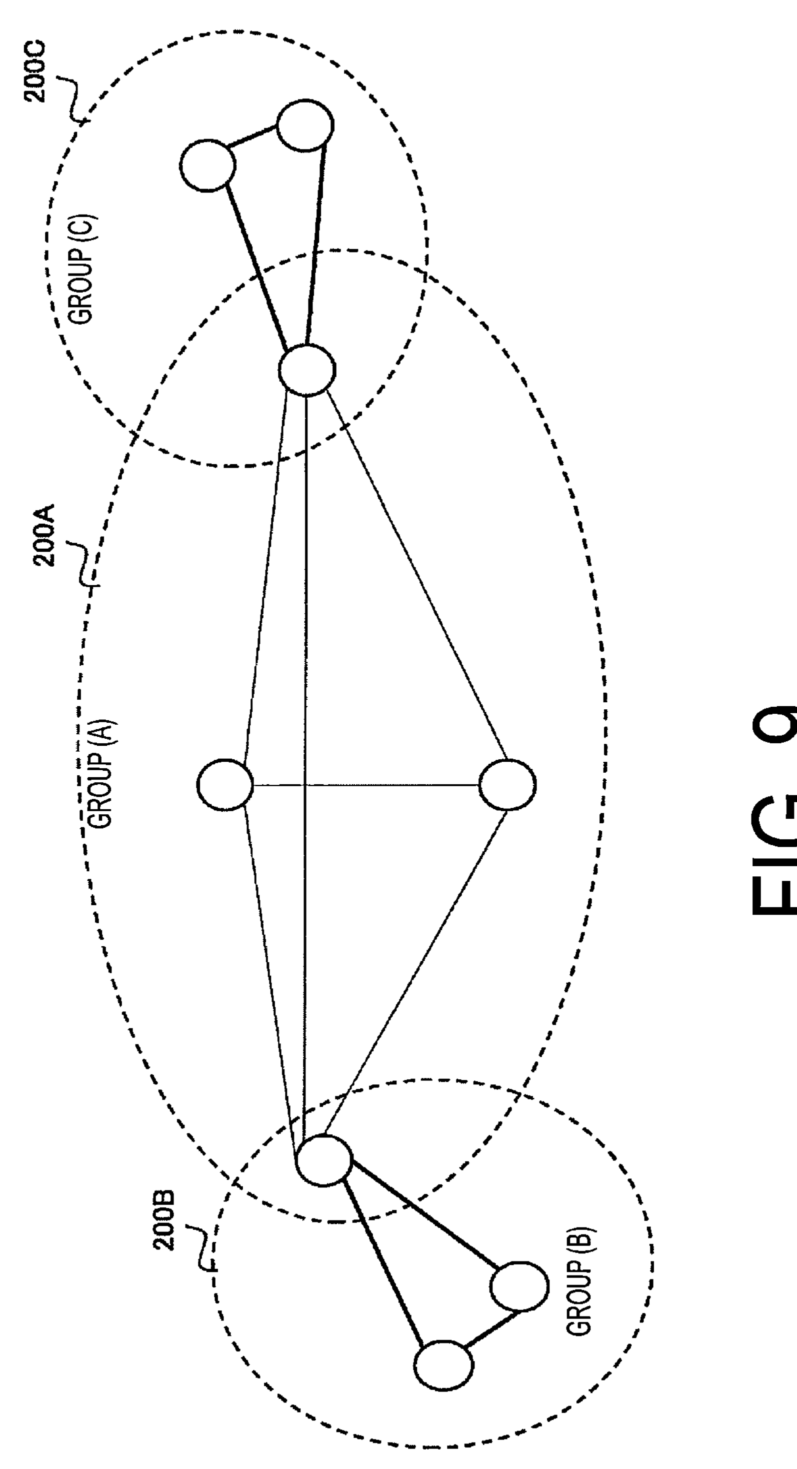
FIG. 9 is a diagram illustrating an operation example when a group according to the embodiment is formed and thereafter a new group is formed below the former group.
Figure 10:
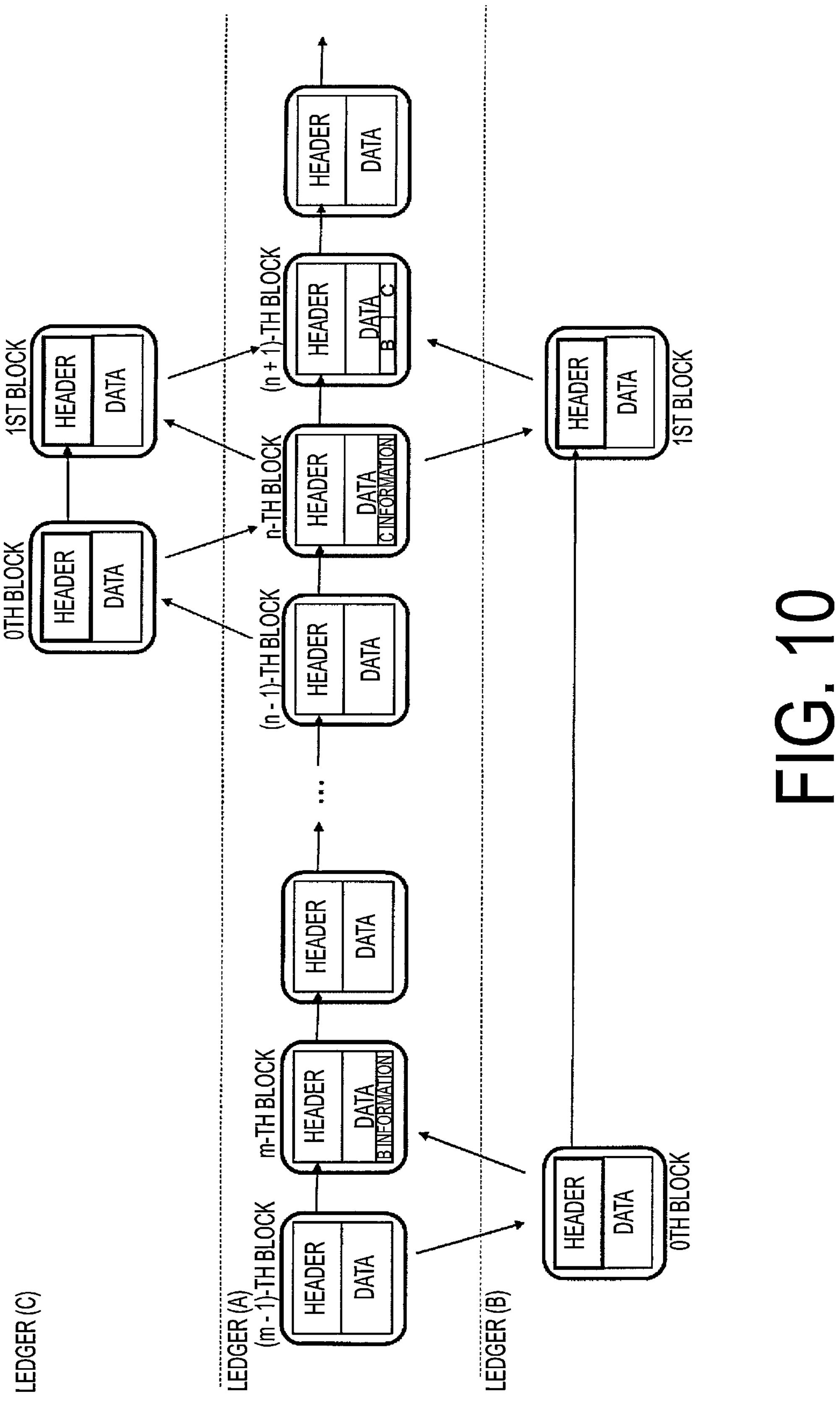
FIG. 10 is a diagram illustrating the operation example when a group according to the embodiment is formed and thereafter a new group is formed below the former group.

FIGS. 9 and 10 are diagrams illustrating an operation example when the group (A) 200A is formed and thereafter the group (B) 200B is newly formed below the group (A) 200A, and further thereafter the group (C) 200C is newly formed below the group (A) 200A. Here, a node belonging to the group (A) 200A is referred to as a node (A), a node belonging to the group (B) 200B is referred to as a node (B), and a node belonging to the group (C) 200C is referred to as a node (C). Here, differences from the operation of FIG. 8 are mainly described.

As illustrated in FIG. 10, first, the node (A) managing the ledger (A) updates the ledger (A) by adding the (m−1)-th block to the ledger (A). Second, the group (B) 200B is formed. The node (B) managing the ledger (B) updates (generates) the ledger (B) by adding the first block in the ledger (B), that is, the 0-th block to the ledger (B). Third, the node (A) managing the ledger (A) updates the ledger (A) by adding the m-th block to the ledger (A). Such an operation is the same as and/or similar to that in FIG. 8.

Fourth, the node (A) managing the ledger (A) updates the ledger (A) by adding the (n−1)-th block to the ledger (A). The (n−1)-th block includes a block header including a hash value calculated from the previous block of the ledger (A) and transaction data for at least one transaction in the group (A) 200A. The block header may further include a chain ID (parent chain ID) indicating the ledger (A) and/or a block height indicating (n−1), which is a block number of the block.

Fifth, the group (C) 200C is formed. The node (C) managing the ledger (C) updates (generates) the ledger (C) by adding an initial block in the ledger (C), that is, the 0-th block to the ledger (C). The 0-th block includes in a block header part thereof a block header of a block of the ledger (A) which is the latest at the time when the 0-th block is added, that is, a block header of the (n−1)-th block of the ledger (A) as the ledger information related to the ledger (A). The 0-th block also includes in a transaction data part thereof transaction data for at least one transaction in the group (C) 200C. Here, the transaction may be, for example, a node joining the group (C) 200C. The transaction data may include a node parameter for the joined node.

Sixth, the node (A) managing the ledger (A) updates the ledger (A) by adding the n-th block to the ledger (A). The n-th block includes in a block header part thereof a hash value calculated from the (n−1)-th block, which is the previous block of the ledger (A). The n-th block also includes in a transaction data part thereof transaction data for at least one transaction in the group (A) 200A and ledger information related to the ledger (C). The ledger information includes a hash value calculated from a block of the ledger (C) which is the latest at the time when the n-th block is added, that is, the 0-th block of the ledger (C), and a chain ID indicating the ledger (C). The ledger information may further include a block height indicating 0, which is a block number of the 0-th block.

Seventh, the node (C) managing the ledger (C) updates the ledger (C) by adding the 1st block in the ledger (C) to the ledger (C). The 1st block includes in a block header part thereof a block header of a block of the ledger (A) which is the latest at the time when the 1st block is added, that is, a block header of the n-th block of the ledger (A) as the ledger information related to the ledger (A). The 1st block also includes in a transaction data part thereof transaction data for at least one transaction in the group (C) 200C. Here, the transaction may be, for example, a node joining the group (C) 200C. The transaction data may include a node parameter for the joined node.

Eighth, the node (B) managing the ledger (B) updates the ledger (B) by adding the 1st block in the ledger (B) to the ledger (B). The 1st block includes in a block header part thereof a block header of a block of the ledger (A) which is the latest at the time when the 1st block is added, that is, a block header of the n-th block of the ledger (A) as the ledger information related to the ledger (A). The 1st block also includes in a transaction data part thereof transaction data for at least one transaction in the group (B) 200B. Here, the transaction may be, for example, a node joining the group (B) 200B. The transaction data may include a node parameter for the joined node.

Ninth, the node (A) managing the ledger (A) updates the ledger (A) by adding the (n+1)-th block to the ledger (A). The (n+1)-th block includes in a block header part thereof a hash value calculated from the n-th block, which is the previous block of the ledger (A). The (n+1)-th block also includes in a transaction data part thereof transaction data for at least one transaction in the group (A) 200A, ledger information related to the ledger (B), and ledger information related to the ledger (C). The ledger information related to the ledger (B) includes a hash value calculated from a block of the ledger (B) which is the latest at the time when the (n+1)-th block is added, that is, the 1st block of the ledger (B), and a chain ID indicating the ledger (B). The ledger information may further include a block height indicating 0, which is a block number of the 1st block of the ledger (B). The ledger information related to the ledger (C) includes a hash value calculated from a block of the ledger (C) which is the latest at the time when the (n+1)-th block is added, that is, the 1st block of the ledger (C), and a chain ID indicating the ledger (C). The ledger information may further include a block height indicating 0, which is a block number of the 1st block of the ledger (C).

Grouping of Lower Layer Groups

Grouping of the Lower Layer Group According to the Embodiment is Described with Reference to FIGS. 11 and 12.

Figure 11:
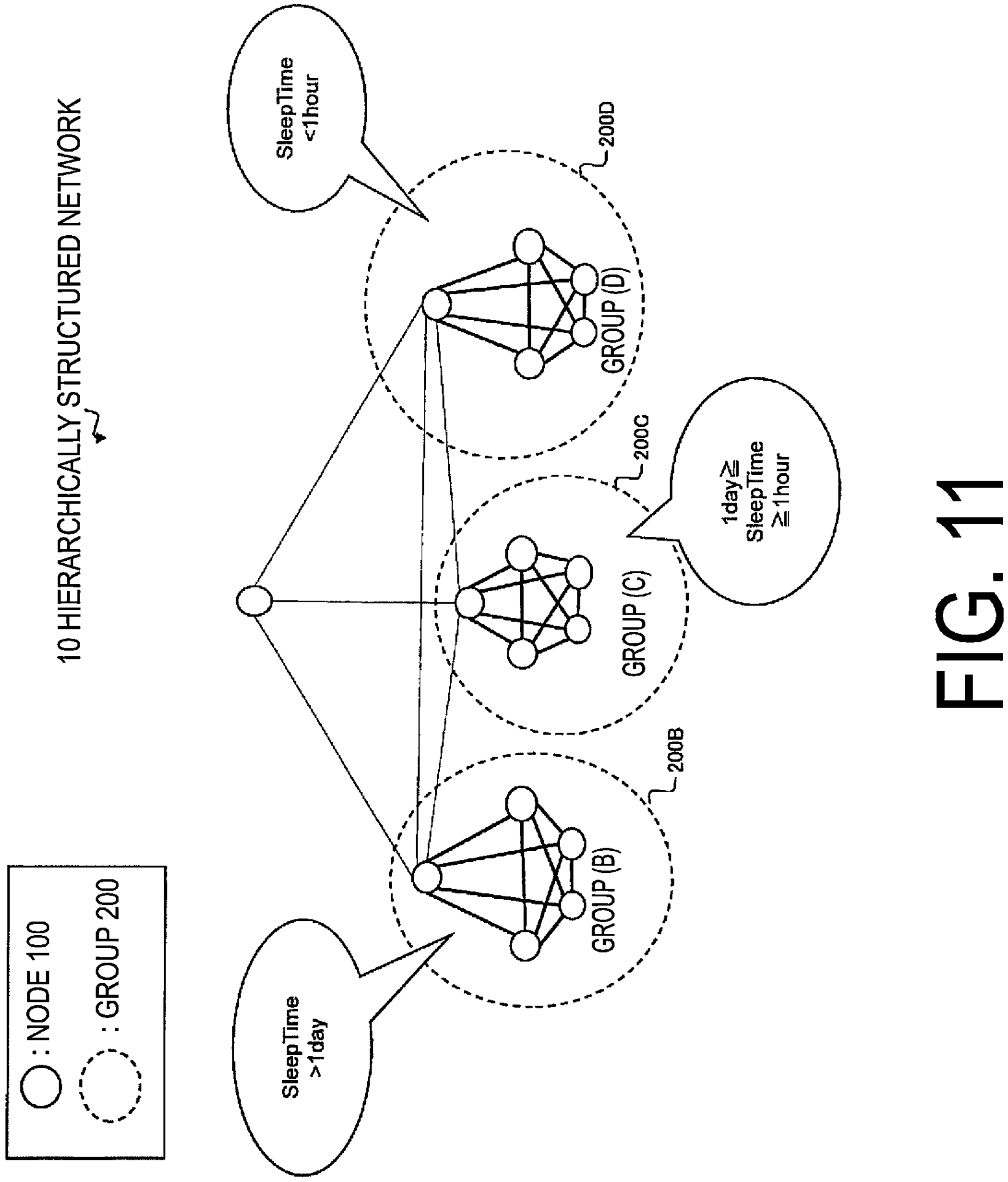
FIG. 11 is a diagram illustrating grouping of a lower layer group according to the embodiment.

As illustrated in FIG. 11, the hierarchically structured network 10 includes a plurality of lower layer groups, the group (B) 200B to the group (D) 200D. Each of the nodes 100 belonging to the plurality of lower layer groups is located in one of the plurality of lower layer groups in accordance with a length of the sleep time of the node 100. As described above, a low-performance node such as an IoT device intermittently performs communication in order to reduce power consumption, enters a sleep state (standby state) while not performing communication, and no transaction occurs during the sleep time (standby time). By performing grouping based on a range of the sleep time in the second and subsequent lower layers, grouping into a group having a long sleep time and a group having a short sleep time can be performed.

Specifically, devices having sleep times close to each other are grouped into the same group. A device having a long sleep time has a low transaction occurrence frequency, and thus has a low calculation frequency, so that the calculation frequency can be reduced. Here, since many devices having long sleep times have low performance, the relevant grouping is effective. In this way, grouping nodes in consideration of the transaction occurrence frequency can suppress an increase in size of the ledgers while suppressing the calculation amount.

The sleep time of each node 100 belonging to one lower layer group among the plurality of lower layer groups may be within a range of a first predetermined time. The sleep time of each node 100 belonging to another lower layer group different from the one lower layer group may be within a range of a second predetermined time different from the first predetermined time. In the example of FIG. 11, each node 100 belonging to the group (B) 200B has a sleep time longer than one day. Each node 100 belonging to the group (C) 200C has a sleep time of one day or shorter and one hour or longer. Each node 100 belonging to the group (D) 200D has a sleep time shorter than one hour. Note that such grouping is an example and the grouping is not limited to the example of FIG. 11.

The maximum number of nodes 100 belonging to each group may be determined in accordance with the performance of the nodes 100 belonging to the group. For example, the limitation of the number of nodes in one group may be determined depending on the node having the lowest performance among the nodes participating in the group. As the number of nodes in one group increases, the update frequency and the size of the ledger tend to increase. Therefore, according to the performance of the node having the lowest performance, the maximum number for the group to which the node belongs is determined.

Figure 12:
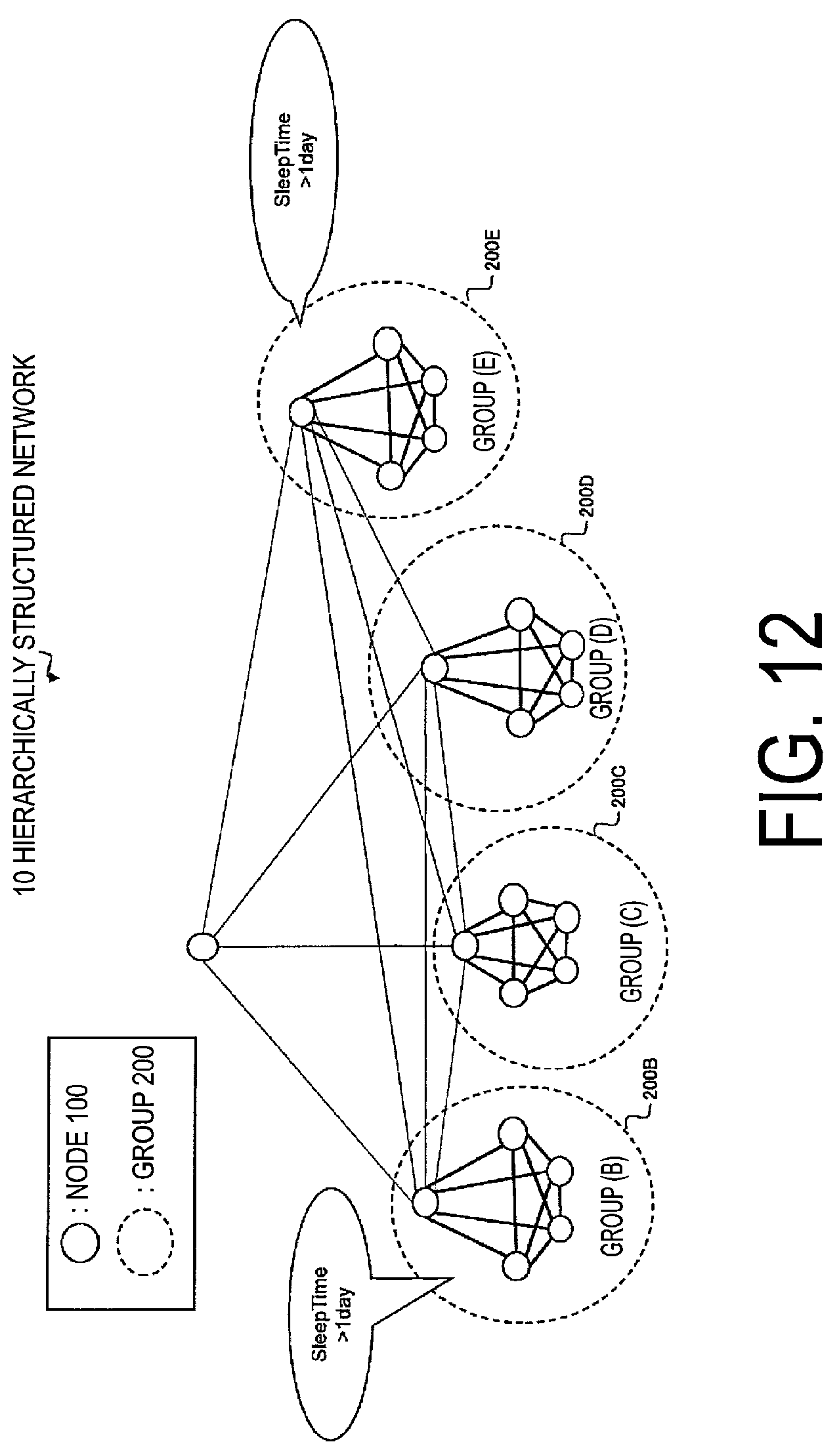
FIG. 12 is a diagram illustrating grouping of a lower layer group according to the embodiment.

As illustrated in FIG. 12, when the number of nodes 100 belonging to a lower layer group exceeds the maximum number of nodes 100 belonging to the lower layer group, a new lower layer group may be formed. FIG. 12 illustrates an example in which a new group (E) 200E including nodes 100 each having a sleep time longer than one day is formed when the number of nodes 100 each having a sleep time longer than one day exceeds the maximum number (limit number) of the group (B) 200B. In this way, when the number of nodes is equal to or longer than the limit number, a group in the same rage of sleep time is newly added. Alternatively, when the number of nodes 100 belonging to a lower layer group exceeds the maximum number of nodes 100 belonging to the lower layer group, a lower layer may be added to form a further lower group.

Priority in Group

A Priority in a Group According to the Embodiment is Described with Reference to FIGS. 13 and 14.

Figure 13:
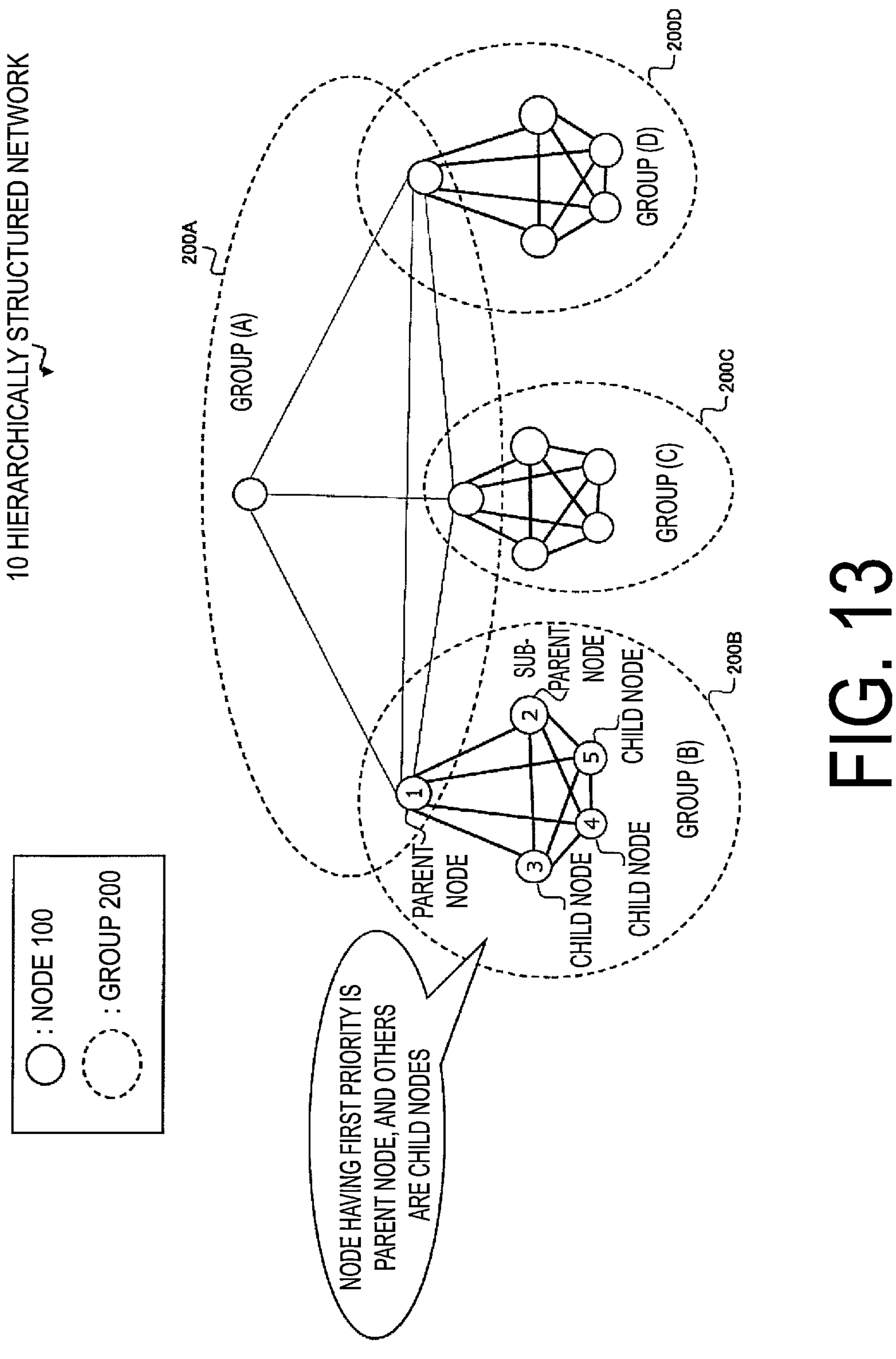
FIG. 13 is a diagram illustrating a priority in a group according to the embodiment.

As illustrated in FIG. 13, performance parameters are used to prioritize the nodes in each group. The priority is calculated based on at least one selected from the group consisting of a battery capacity, a calculation capability, a storage capacity, and a sleep time, which are the performance parameters. In one group, a node having the first priority is set as a parent node, a node having the second priority is set as a sub-parent node, and the other nodes are set as child nodes. In FIG. 13, the priorities of the nodes 100 in the group (B) 200B, which is a lower layer group, are indicated by numerals. For example, when a new node 100 joins the lower layer group, the new node 100 or another node 100 determines whether to set the new node 100 as a parent node, a sub-parent node, or a child node, based on the performance of the new node 100.

The plurality of nodes 100 forming one group include the parent node that belongs to both the upper layer group and the lower layer group and manages the lower layer ledger and the upper layer ledger, the sub-parent node that belongs to the lower layer group and is changed when the parent node no longer functions as the parent node to a new parent node, and the child node 100 that belongs to the lower layer group and does not correspond to any of the parent node 100 and the sub-parent node 100.

Here, the sub-parent node 100 has higher performance than the child node 100, and the parent node 100 has higher performance than the sub-parent node 100. The sub-parent node 100 plays roles more than those of the child node 100, and the parent node 100 plays roles more than those of the sub-parent node 100. Therefore, the roles played by the node 100 is matched with the performance the node 100.

For example, when a transaction occurs in the lower layer group and the lower layer ledger is updated, the parent node notifies the upper layer group that the lower layer ledger is updated. As a result, a transaction occurs in the upper layer group (the upper layer ledger is updated). Specifically, the parent node notifies the node 100 belonging to the upper layer group of the update of the lower layer ledger in accordance with the transaction in the lower layer group, and the node 100 belonging to the upper layer group updates the upper layer ledger in accordance with the notification from the parent node.

When the upper layer ledger of the upper layer group is updated, the parent node passes the upper layer ledger to the sub-parent node. That is, when the upper layer ledger is updated, the parent node shares the updated upper layer ledger with the sub-parent node.

In the example of FIG. 13, when a transaction occurs in the group (B) 200B and the ledger (B) is updated, the parent node of the group (B) 200B notifies the group (A) 200A that the ledger (B) is updated. This causes a transaction to occur in the group (A) 200A (the ledger (A) is updated). When the ledger (A) of the group (A) 200A is updated, the parent node of the group (B) 200B passes the ledger (A) to the sub-parent node of the group (B) 200B.

Figure 14:
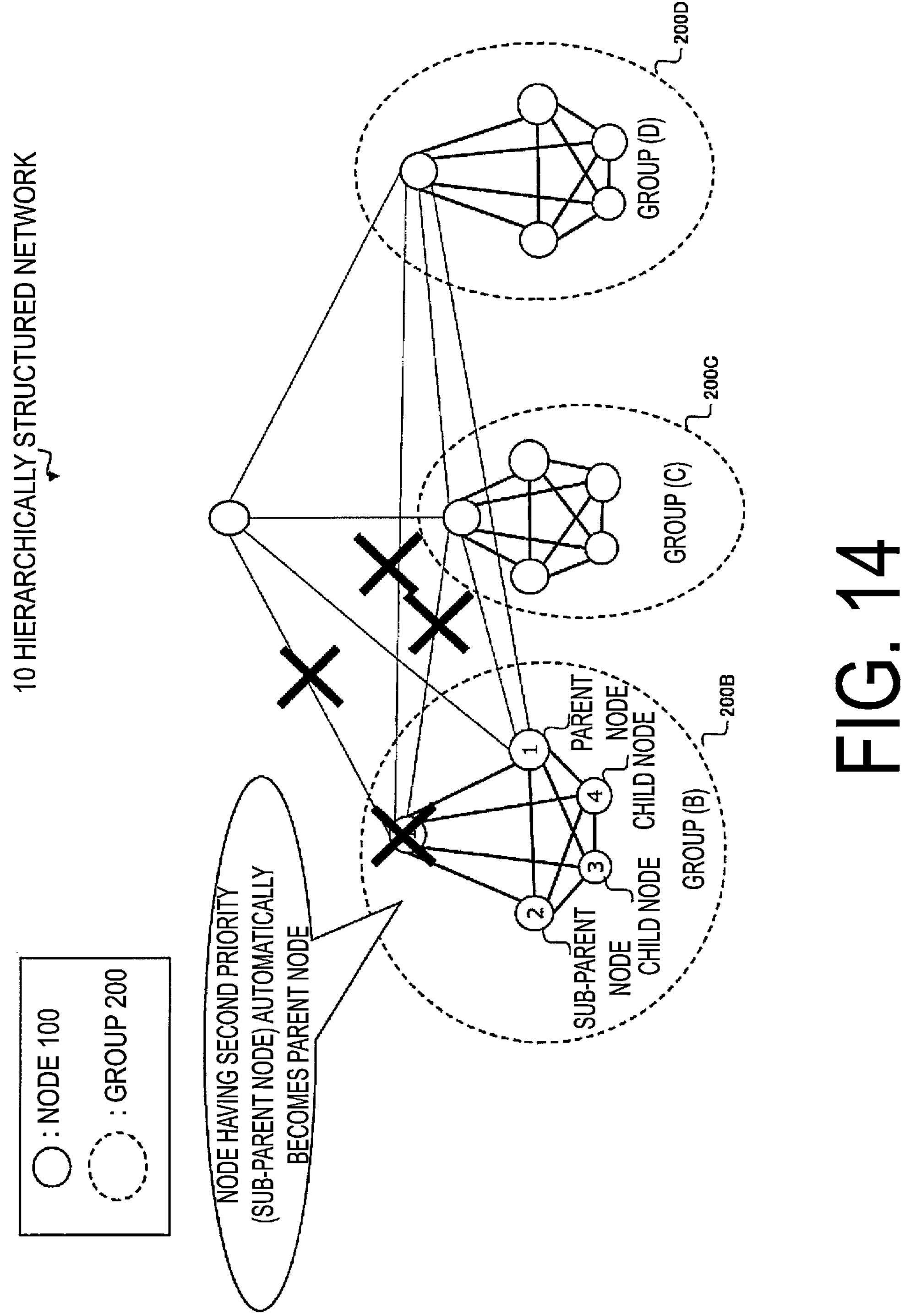
FIG. 14 is a diagram illustrating a priority in a group according to the embodiment.

As illustrated in FIG. 14, when the parent node is removed from the group for some reason (for example, the parent node itself leaves the group, or is forced to be removed due to fraud, etc.), the sub-parent node having the second priority automatically receives the first priority, that is, becomes a new parent node. The priorities of the other nodes are also raised by one. When the sub-parent node is changed to a new parent node or when the sub-parent node no longer functions as the sub-parent node, the child node having the highest priority among the plurality of child nodes is changed to a new sub-parent node. Note that since the priorities need to be associated with each corresponding group, each node 100 has a parameter value of the priority associated with the chain ID.

The node 100 initially set as the parent node has no problem because the node 100 is selected based on the performance parameter, but the new parent node set based on the raise because of the parent node removal may be insufficient in the performance parameter. For this reason, a threshold value may be set for the performance parameters of each layer, and the parent node having the performance parameter lower than the threshold value may be changed (rotated) every predetermined number of transactions. That is, when, in response to the removal of the parent node, the sub-parent node is set as a new parent node and the performance of the new parent node does not satisfy a predetermined criterion, the node 100 set as the parent node may be changed every predetermined number of transactions. At the time of the change, the priority of the parent node is set to the lowest in the group, and the sub-parent node becomes the next parent node. The number of transactions for rotating the parent node is held as a node parameter and can be changed.

Example of Node Parameters Stored in Ledgers

An Example of the Node Parameters Stored in the Ledgers According to the Embodiment is Described with Reference to FIG. 15.

As described above, in the embodiment, the node parameter may be stored in th ledger. For example, when a new node 100 joins the upper layer group, each node 100 belonging to the upper layer group may update the upper layer ledger to add a parameter of the new node 100 that has joined the upper layer group to the upper layer ledger. When a new node 100 joins the lower layer group, each node 100 belonging to the lower layer group may update the lower layer ledger to add a parameter of the new node 100 that has joined the lower layer group to the lower layer ledger.

Figure 15:
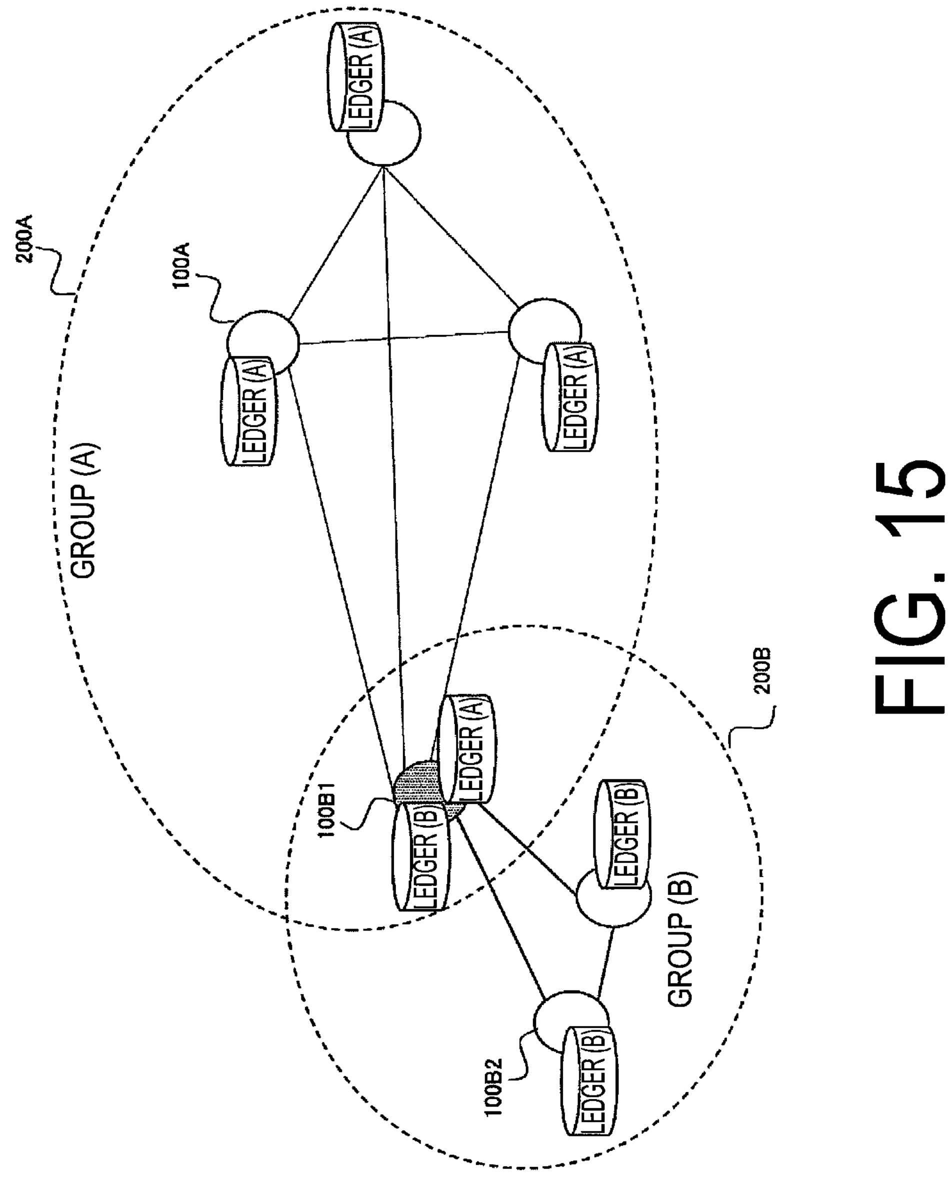
FIG. 15 is a diagram for explaining an example of node parameters stored in ledgers according to the embodiment.

As illustrated in FIG. 15, the node 100 other than the node 100A in the uppermost layer and the node 100B2 in the lowest layer, that is, the node 100B1 belongs to two groups. Therefore, the node 100B1, which needs to hold a common ledger for each group, has two ledgers (ledger (A) and ledger (B)). Here, each of the two groups (group (A) and group (B)) has a parameter to be distinguished in a form associated with a chain ID. As described above, the ledger (A), which is the upper layer ledger, includes the hash value and the like of the ledger (B), which is the lower layer ledger. Hence, when the ledger (B) is updated, the ledger (A) also needs to be updated.

An example of the node parameters stored in the ledgers is at least one of the following parameters.

- Chain ID: Up to two are required. The chain ID makes it possible to determine which of two groups is the upper layer group.
- Hash value of corresponding ledger: This is a value associated with a chain ID, and up to two are required.
- Node priority: This is a value associated with a chain ID, and up to two are required.
- Parent chain ID: A chain ID of the upper layer in which the parent node of the group participates. The hierarchical structure can be smoothly automated by clarifying the parent-child relationship of the groups.
- Validator Node ID: An ID of the node proving that the corresponding ledger is correct.
- Parent node rotation value: The number of transactions that cause the parent node rotation. When the number of parent node transactions reaches this value, rotation of the parent node occurs.
- The number of parent node transactions: The number of transactions occurring after becoming the parent node.
- Performance parameter of the node. For example, the performance parameter is at least one selected from the group consisting of a battery capacity, a calculation capability, a storage capacity, and a sleep time.

Configuration Example of Node

A Configuration Example of the Node 100 (Device) According to the Embodiment is Described with Reference to FIG. 16.

Figure 16:
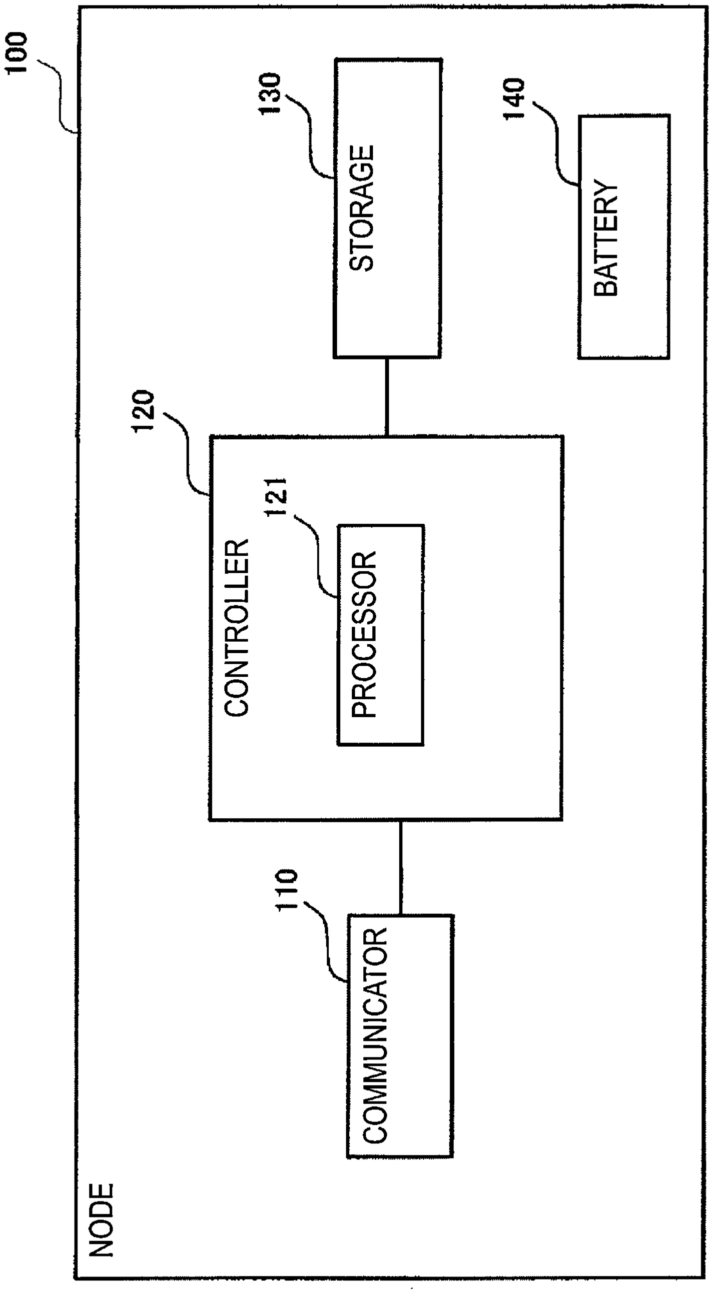
FIG. 16 is a diagram illustrating a configuration example of a node according to the embodiment.

As illustrated in FIG. 16, the node 100 includes a communicator 110, a controller 120, a storage 130, and a battery 140.

The communicator 110 includes a communication interface for communicating with another node. The communication interface may be a wireless communication interface. The communication interface may be a wired communication interface.

The controller 120 performs various types of control and processing in the node 100. Such processing includes processing described above and processing described later. The controller 120 includes a processor 121. The processor 121 executes programs stored in the storage 130 to perform various types of processing.

The storage 130 stores the programs to be executed by the processor 121 and information to be used for processing by the processor 121. The storage 130 includes a non-volatile storage device and a volatile storage device.

The battery 140 accumulates electrical power to be supplied to portions of the node 100 (device).

The nodes 100 configured as described above form the hierarchically structured network 10 in the system using the blockchain technology. The storage 130 stores the ledger(s). The communicator 110 communicates with another node in the hierarchically structured network 10, to be more specific, another node having a direct communication connection with the node itself. The controller 120 determines a layer in which a target node is located in the hierarchically structured network 10, in accordance with the performance of the target node 100. The target node is the node itself or another node.

The node 100 may belong to the upper layer group. In this case, the storage 130 stores the upper layer ledger as the ledger. The controller 120 may update the upper layer ledger in accordance with each of the transaction in the upper layer group and the transaction in the lower layer group. The communicator 110 may receive the ledger information related to the lower layer ledger from the lower layer group. The controller 120 may manage ledger information related to the lower layer ledger as a part of the upper layer ledger.

The node 100 may belong to the lower layer group. In this case, the storage 130 stores the lower layer ledger as the ledger. The controller 120 may update, without updating the lower layer ledger in accordance with the transaction in the upper layer group, the lower layer ledger in accordance with the transaction in the lower layer group. The communicator 110 may receive the ledger information related to the upper layer ledger from the upper layer group. The controller 120 may manage ledger information related to the upper layer ledger as a part of the lower layer ledger.

Operation Flow Example

An Operation Flow Example According to the Embodiment is Described with Reference to FIGS. 17 to 20.

(1) Flow Example of when Node Joins

Figure 17:
FIG. 17 is a diagram illustrating a flow example of when a node joins the hierarchically structured network according to the embodiment.

FIG. 17 is a diagram illustrating a flow example of when a node joins the hierarchically structured network 10 according to the embodiment. In FIG. 17, dashed lines indicate steps which may be omitted.

In step S101, a newly joined node makes a join application to a node already participating in the group.

In step S102, the node that has received the join application or another node performs pre-confirmation whether the node making the join application has a calculation ability, is in a fraudulent state, and the like using a quarantine network, for example.

When the result of the pre-confirmation is NG (step S102: NO), in step S103, the node that has received the join application or another node rejects the join application. On the other hand, when the result of the pre-confirmation is OK (step S102: YES), the processing proceeds to step S104.

In step S104, the node that has received the join application or another node determines whether to permit the join application. An administrator may determine how to permit the node to join. In step S104, the node that has received the join application or another node may determine whether the node is permitted to join based on voting by all or some of the nodes. For a public type (free participation) group, step S104 may be skipped.

When determining that the node is not permitted to join (step S104: NO), in step S105, the node that has received the join application or another node rejects the join application. On the other hand, when determining that the node is permitted to join (step S104: YES), the processing proceeds to step S106.

In step S106, the node that has received the join application or another node determines a layer which the newly joined node is to join (located in), in accordance with the performance of the newly joined node. Here, a method of determining the layer may be automatic determination by comparing a preset threshold value with the performance parameter. The method of determining the layer may be determination based on performance superiority or inferiority to another node. Alternatively, the method of determining the layer may be determination based on voting by all or some of the nodes.

In step S107, the node that has received the join application or another node determines the group that the newly joined node is to join (to be located in), in accordance with the sleep time of the newly joined node. Here, the method of determining the group may be automatic determination by comparing a preset threshold value with the sleep time. The method of determining the group may be determination by comparing the sleep time with that of another node. The method of determining the group may be determination based on voting by all or some of the nodes. Note that when the newly joined node joins the uppermost layer or when only one group is in the same layer, step S107 may be skipped.

In step S108, each node belonging to the group, which the newly joined node participates in, adds the performance parameter of the newly joined node to their own ledger. As described above, the ledger stores therein the performance parameter of each node participating in the group.

In step S109, the node that has received the join application or another node determines a priority of the newly joined node, in accordance with the performance of the newly joined node. For agreement on the priority, the same processing as and/or similar processing to that for a normal transaction consensus may be performed.

(2) Flow Example of Parent Node Rotation

Figure 18:
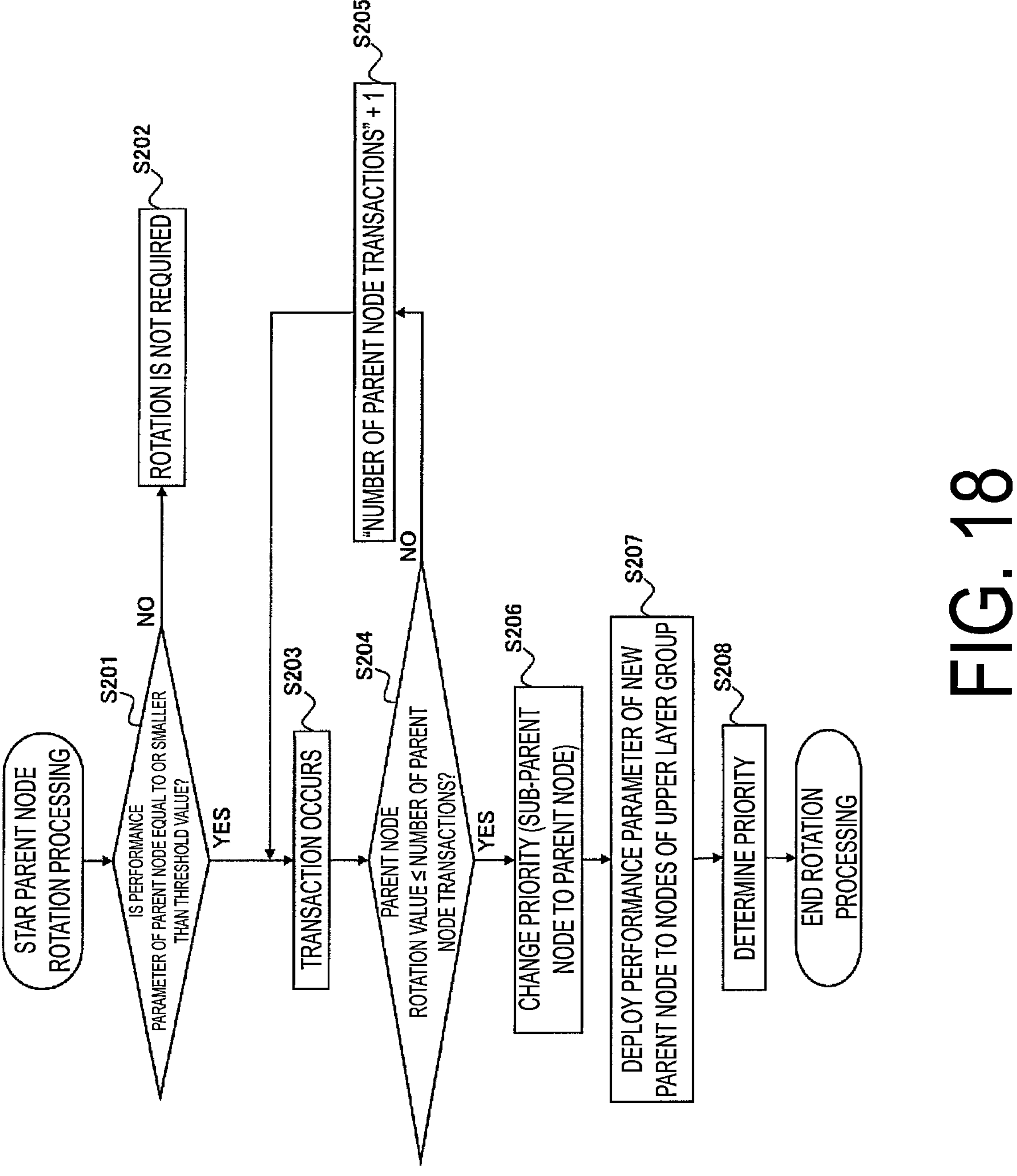
FIG. 18 is a diagram illustrating a flow example of a parent node rotation in the hierarchically structured network according to the embodiment.

FIG. 18 is a diagram illustrating a flow example of parent node rotation in the hierarchically structured network 10 according to the embodiment.

In step S201, the parent node or another node determines whether the performance parameter of the parent node is equal to or smaller than the threshold value. When the performance parameter of the parent node is greater than the threshold value (step S201: NO), the parent node rotation is not required (step S202). On the other hand, when the performance parameter of the parent node is equal to or smaller than the threshold value (step S201: YES), the parent node rotation is enabled.

In step S203, a transaction involving the parent node occurs.

In step S204, the parent node or another node determines whether the number of parent node transactions has reached the parent node rotation value. When the number of parent node transactions has not reached the parent node rotation value (step S204: NO), the number of parent node transactions is incremented (1 is added) in step S205.

On the other hand, when the number of parent node transactions has reached the parent node rotation value (step S204: YES), each node in the group to which the parent node belongs changes the priority in the group in step S206. For example, the node of the parent node (first priority) is changed to the lowest priority, the priorities of the other nodes are raised by one, and the sub-parent node is set as a new parent node.

In step S207, the new parent node or another node deploys the performance parameter of the new parent node to the nodes in the upper layer group (notifies the nodes in the upper layer group of the performance parameter of the new parent node). Each node in the upper layer group adds the performance parameter of the new parent node to the upper layer ledger.

In step S208, the nodes belonging to the upper layer group (including the new parent node) determine priorities in the upper layer group. Since the performance parameter of the new parent node is lower than that of the previous parent node, the new parent node does not have the first priority in the upper layer group, but a condition for the new parent node to have the second or lower priority may be included as exceptional processing.

(3) Flow Example of when Node Joins Lower Layer

Figure 19:
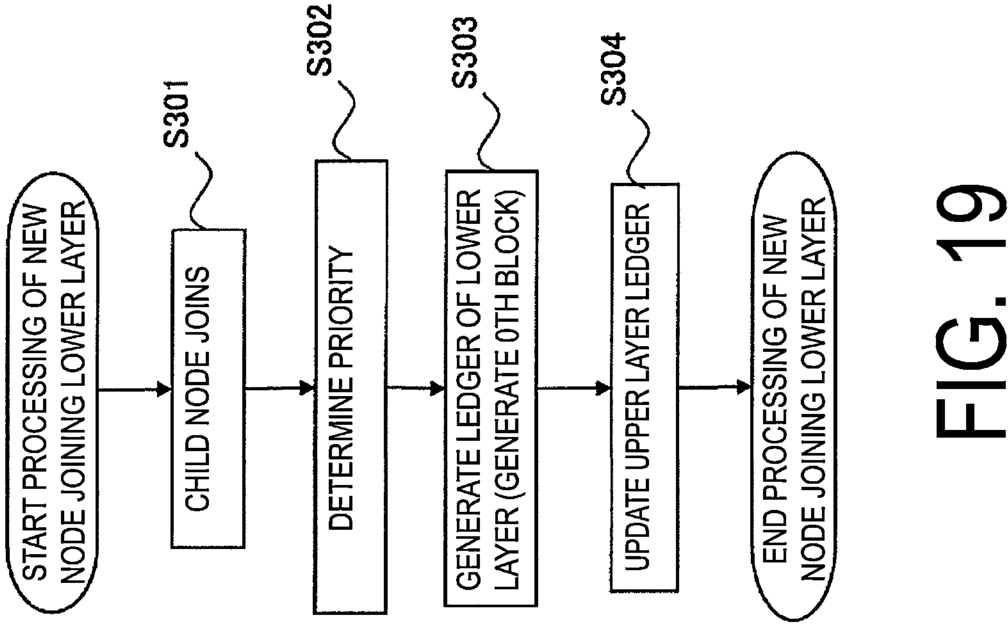
FIG. 19 is a diagram illustrating a flow example of when a node joins a lower layer (joins a lower layer group) in the hierarchically structured network according to the embodiment.

FIG. 19 is a diagram illustrating a flow example of when a node joins the lower layer (joins a lower layer group) in the hierarchically structured network 10 according to the embodiment.

In step S301, a child node joins the lower layer.

In step S302, a priority of the node that has joined the lower layer is determined. When one node joins a new group, the node requisitely receives second priority, and the node becomes a sub-parent node.

In step S303, a lower layer ledger of the lower layer (new lower layer group) is generated. As described above, the lower layer ledger may include a block header and a parent chain ID of the current upper layer ledger.

In step S304, the upper layer ledger is updated in response to the generation of the lower layer ledger. As described above, the upper layer ledger may include information (a hash value, a chain ID, or the like) of the lower layer ledger.

(4) Flow Example at Node Removal Time

Figure 20:
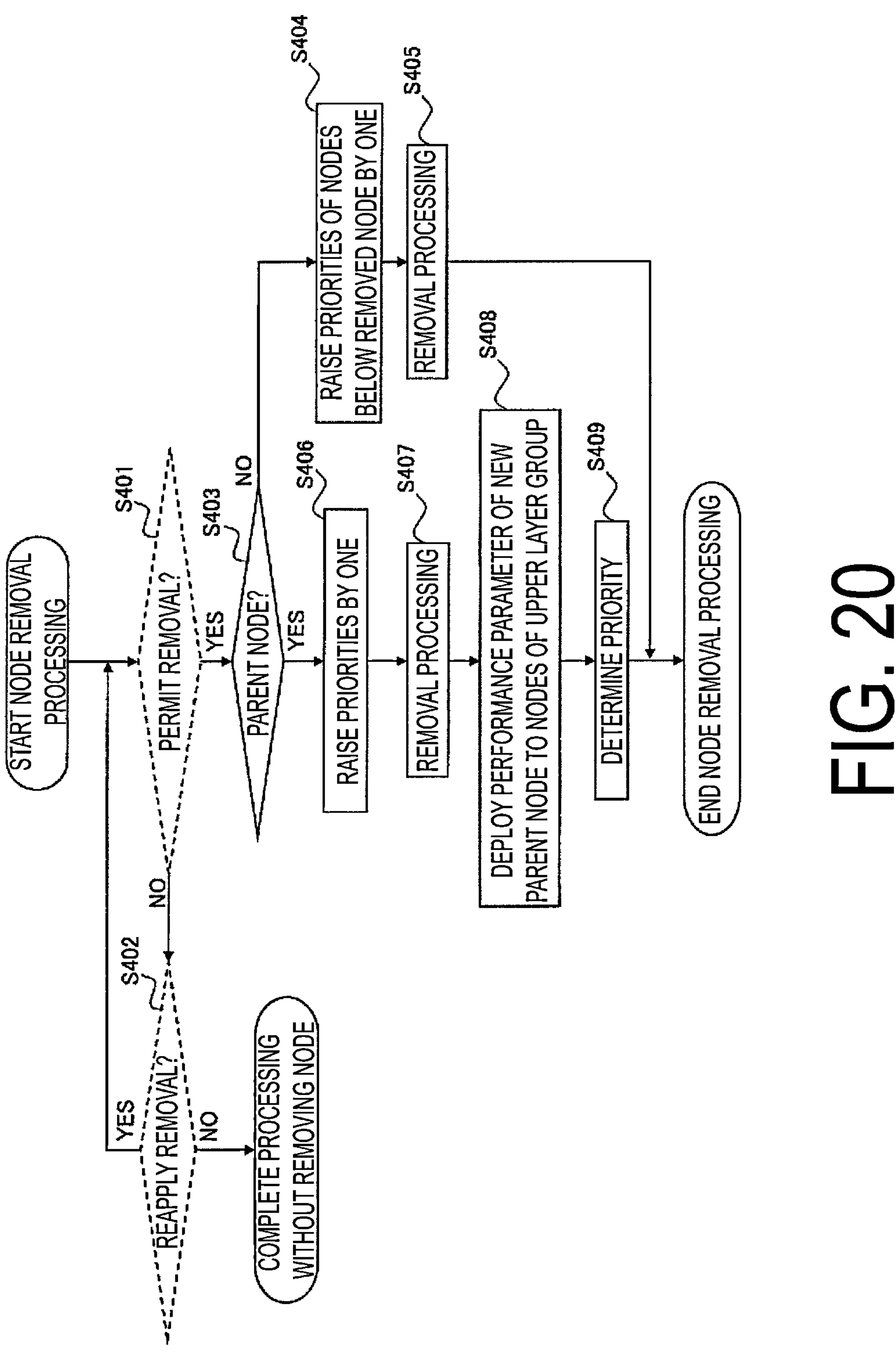
FIG. 20 is a diagram illustrating a flow example at node removal in the hierarchically structured network according to the embodiment.

FIG. 20 is a diagram illustrating a flow example at node removal time in the hierarchically structured network 10 according to the embodiment. In FIG. 20, dashed lines indicate steps which may be omitted.

In step S401, a node in the group to which a removal target node requested to be removed belongs or another node determines whether to permit the removal request, by using a quarantine network, for example. For example, whether inconsistency or the like does not occur even when the node requested to be removed is removed.

When the removal request is rejected (not permitted) (step S401: NO), in step S402, the removal target node determines whether to reapply the removal request. Here, a restriction may be imposed so that the re-application is made after removing the cause of the non-permission. When the removal request is reapplied (step S402: YES), the processing returns to step S401.

In step S403, whether the removal target node is a parent node is determined. When the removal target node is not a parent node (step S403: NO), the priorities below the removal target node are raised by one (step S404), and the removal target node is removed from the group (S405). Note that the removal processing is performed in the same manner as and/or a similar manner to a normal transaction.

On the other hand, when the removal target node is a parent node (step S403: YES), the priorities of the nodes in the group are raised by one (step S406), and the removal target node is removed from the group (S407). Note that the removal processing is performed in the same manner as and/or a similar manner to a normal transaction. In step S408, the performance parameter of the new parent node is deployed (or given by notification) to the nodes of the upper layer group. In step S409, the nodes belonging to the upper layer group (including the new parent node) determine priorities in the upper layer group. Since the performance parameter of the new parent node is lower than that of the previous parent node, the new parent node does not have the first priority in the upper layer group, but a condition for the new parent node to have the second or lower priority may be included as exceptional processing.

Other Embodiments

In the embodiment described above, the case where a new node joins the hierarchically structured network 10 and the case where a node is removed from the hierarchically structured network 10 are described, but the embodiment is not limited thereto. For example, in response to a change in the performance of a node already located in any group in the hierarchically structured network 10, the node may be relocated in a group different from the group in which the node is currently located. In response to a change in the performance of a node already located in any layer in the hierarchically structured network 10, the node may be relocated in a layer different from the layer in which the node is currently located. In response to a new layer or group being formed in the hierarchically structured network 10, the node may be relocated in a layer or group different from the layer or group in which the node is currently located. When the layer or group in which the node is located is changed, processing of the node joining the layer or group in which the node is to be relocated may be performed after the processing of removing the node from the layer or group in which the node is originally located.

The embodiment described above mainly assumes that the node 100 is a battery-driven device. However, the hierarchically structured network 10 may include an external power supply-driven device. For example, a device connected to an external power supply may be located in the uppermost layer in the hierarchically structured network 10.

The operation flows described above can be separately and independently implemented, and also be implemented in combination of two or more of the operation flows. For example, some steps of one operation flow may be added to another operation flow or some steps of one operation flow may be replaced with some steps of another operation flow. The order of steps in each operation flow described above is merely an example and may be changed as appropriate.

A program may be provided that causes a computer to execute each of the processing operations performed by the node 100. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM. Circuits for executing each of the processing operations performed by the node 100 may be integrated, and at least a part of the node 100 may be implemented as a semiconductor integrated circuit (chip set, system on a chip (SoC)).

The phrases "based on" and "depending on" used in the present disclosure do not mean "based only on" and "only depending on," unless specifically stated otherwise. The phrase "based on" means both "based only on" and "based at least in part on". Similarly, the phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise" and variations thereof do not mean "include only items stated" but instead mean "may include only items stated" or "may include not only the items stated but also other items". The term "or" used in the present disclosure is not intended to be "exclusive or". Further, any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

Embodiments have been described above in detail with reference to the drawings, but specific configurations are not limited to those described above, and various design variation can be made without departing from the gist of the present disclosure.

SUPPLEMENTARY NOTE

Features relating to the embodiments described above are described.

(1)

A system using blockchain technology, the system including:

a plurality of nodes configured to form a network having a hierarchical structure and to each manage a ledger, wherein each of the plurality of nodes is located, based on a performance of a corresponding one of the plurality of nodes, in a layer corresponding to the performance among a plurality of layers in the hierarchical structure.

(2)

The system according to (1) described above, wherein the performance includes at least one selected from the group consisting of a calculation capability, a storage capacity, and a battery capacity.

(3)

The system according to (1) or (2) described above, wherein when a new node joins, the new node or another node is configured to determine a layer in which the new node is to be located, based on a performance of the new node.

(4)

The system according to any one of (1) to (3) described above, including:

an upper layer group formed by one or more nodes located in a predetermined layer and configured to manage an upper layer ledger; and a lower layer group formed by one or more nodes located in a layer lower than the predetermined layer and configured to manage a lower layer ledger different from the upper layer ledger, wherein the one or more nodes belonging to the lower layer group have a lower performance than the one or more nodes belonging to the upper layer group.

(5)

The system according to (4) described above, wherein the one or more nodes belonging to the upper layer group are configured to update the upper layer ledger in accordance with each of a transaction in the upper layer group and a transaction in the lower layer group.

(6)

The system according to (4) or (5) described above, wherein the one or more nodes belonging to the lower layer group are configured to update the lower layer ledger in accordance with a transaction in the lower layer group without updating the lower layer ledger in accordance with a transaction in the upper layer group.

(7)

The system according to (6) described above, further including a plurality of lower layer groups including the lower layer group, wherein one or more nodes belonging to any one of the plurality of lower layer groups is to be located in the lower layer group corresponding to a length of a sleep time of each of the one or more nodes.

(8)

The system according to (7) described above, wherein the sleep time of each of the one or more nodes belonging to one lower layer group among the plurality of lower layer groups is within a range of a first predetermined time, and the sleep time of each of the one or more nodes belonging to another lower layer group different from the one lower layer group is within a range of a second predetermined time different from the first predetermined time.

(9)

The system according to any one of (4) to (8) described above, wherein a maximum number of the one or more nodes belonging to each of the plurality of lower layer groups is determined in accordance with a performance of the one or more nodes belonging to a corresponding one of the plurality of lower layer groups.

(10)

The system according to (9) described above, wherein a new lower layer group is formed when the number of the one or more nodes belonging to the corresponding one of the plurality of lower layer groups exceeds the maximum number of the one or more nodes belonging to the plurality of lower layer groups.

(11)

The system according to any one of (4) to (10) described above, wherein the plurality of nodes include:

a parent node belonging to both the upper layer group and the lower layer group and configured to manage the lower layer ledger and the upper layer ledger;

a sub-parent node belonging to the lower layer group and configured to be changed to a new parent node when the parent node no longer functions as the parent node; and a child node belonging to the lower layer group and not corresponding to any of the parent node and the sub-parent node.

(12)

The system according to (11) described above, wherein the sub-parent node has a higher performance than the child node, and the parent node has a higher performance than the sub-parent node.

(13)

The system according to (11) or (12) described above, wherein when a new node joins the lower layer group, the new node or another node is configured to determine whether to set, based on a performance of the new node, the new node as the parent node, the sub-parent node, or the child node.

(14)

The system according to any one of (11) to (13) described above, wherein a child node having a highest priority among a plurality of child nodes is configured to be changed to a new sub-parent node when the sub-parent node is changed to a new parent node or when the sub-parent node no longer functions as the sub-parent node.

(15)

The system according to (11) or (12) described above, wherein the parent node is configured to notify the one or more nodes belonging to the upper layer group of an update of the lower layer ledger, in response to a transaction in the lower layer group, and the one or more nodes belonging to the upper layer group are configured to update the upper layer ledger in response to the notifying from the parent node.

(16)

The system according to any one of (11) to (15) described above, wherein the parent node is configured to share the updated upper layer ledger with the sub-parent node when the upper layer ledger is updated.

(17)

The system according to any one of (11) to (16) described above, wherein the node set as the parent node is configured to be changed every predetermined number of transactions when the sub-parent node is set as the new parent node in response to removal of the parent node and a performance of the new parent node does not satisfy a predetermined criterion.

(18)

The system according to any one of (4) to (17) described above, wherein each of the one or more nodes belonging to the upper layer group is configured to update, when a new node is joined to the upper layer group, the upper layer ledger to add a parameter of the new node having joined the upper layer group to the upper layer ledger, and each of the one or more nodes belonging to the lower layer group is configured to update, when a new node joins the lower layer group, the lower layer ledger to add a parameter of the new node having joined the lower layer group to the lower layer ledger.

(19)

A node forming a network having a hierarchical structure in a system using blockchain technology, the node including:

a storage configured to store a ledger;

a communicator configured to communicate with another node in the network; and a controller configured to determine a layer in which a target node is to be located in the network, in accordance with a performance of the target node, wherein the target node is the node or the other node.

(20)

The node according to (19) described above, wherein when the node belongs to an upper layer group formed by one or more nodes located in a predetermined layer:

the storage is configured to store an upper layer ledger as the ledger; and the controller is configured to update the upper layer ledger in accordance with each of a transaction in the upper layer group and a transaction in a lower layer group formed by one or more nodes located in a layer lower than the predetermined layer.

(21)

The node according to (20) described above, wherein when the node belongs to the lower layer group:

the storage is configured to store a lower layer ledger as the ledger; and the controller is configured to update the lower layer ledger in accordance with a transaction in the lower layer group without updating the lower layer ledger in accordance with the transaction in the upper layer group.

(22)

A program causing a node forming a network having a hierarchical structure in a system using blockchain technology to perform:

processing of storing a ledger;

processing of communicating with another node in the network; and processing of determining a layer in which a target node is to be located in the network, in accordance with a performance of the target node, wherein the target node is the node or the other node.

(23)

A system using blockchain technology, the system including:

a network including a plurality of groups including a first group formed by one or more nodes configured to manage a first ledger and a second group formed by one or more nodes configured to manage a second ledger different from the first ledger, wherein the one or more nodes belonging to the second group are configured to notify the first group of ledger information related to the second ledger, and each of the one or more nodes belonging to the first group is configured to manage the ledger information as a part of the first ledger.

(24)

The system according to (23) described above, wherein the ledger information includes a chain ID indicating the second ledger.

(25)

The system according to (23) or (24) described above, wherein the ledger information includes a hash value calculated from a block of the second ledger.

(26)

The system according to any one of (23) to (25) described above, wherein the ledger information includes a block height indicating a block number of the second ledger.

(27)

The system according to any one of (23) to (26) described above, wherein the first group is an upper layer group configured to manage an upper layer ledger as the first ledger, the second group is a lower layer group configured to manage a lower layer ledger as the second ledger, and each of the one or more nodes belonging to the upper layer group is configured to store the ledger information given by notification from the lower layer group in a transaction data part of a block of the upper layer ledger.

(28)

The system according to any one of (23) to (26) described above, wherein the first group is a lower layer group configured to manage a lower layer ledger as the first ledger, the second group is an upper layer group configured to manage an upper layer ledger as the second ledger, and each of the one or more nodes belonging to the lower layer group is configured to store the ledger information given by notification from the upper layer group in a header part of a block of the lower layer ledger.

(29)

The system according to (27) or (28) described above, wherein the one or more nodes belonging to the upper layer group are configured to update the upper layer ledger in accordance with each of a transaction in the upper layer group and a transaction in the lower layer group.

(30)

The system according to any one of (27) to (29) described above, wherein the one or more nodes belonging to the lower layer group are configured to update the lower layer ledger in accordance with a transaction in the lower layer group without updating the lower layer ledger in accordance with a transaction in the upper layer group.

(31)

A node belonging to a first group formed by one or more nodes configured to manage a first ledger in a system using blockchain technology, the node including:

a storage configured to store a first ledger;

a communicator configured to receive ledger information related to a second ledger different from the first ledger from a second group formed by one or more nodes configured to manage the second ledger; and a controller configured to manage the ledger information as a part of the first ledger.

(32)

A program causing a node belonging to a first group formed by one more nodes configured to manage a first ledger in a system using blockchain technology to perform:

processing of storing a first ledger;

processing of receiving ledger information related to a second ledger different from the first ledger from a second group formed by one or more nodes configured to manage the second ledger; and processing of managing the ledger information as a part of the first ledger.

REFERENCE SIGNS

10: Hierarchically structured network
100: Node
110: Communicator
120: Controller
121: Processor
130: Storage
140: Battery
200: Group

The invention claimed is:

1. A system using blockchain technology, the system comprising:

a network comprising a plurality of groups comprising an upper layer group formed by one or more nodes configured to manage an upper layer ledger and a lower layer group formed by one or more nodes configured to manage a lower layer ledger different from the upper layer ledger, wherein the one or more nodes belonging to the lower layer group are configured to send, to the upper layer group, ledger information related to the lower layer ledger, each of the one or more nodes belonging to the upper layer group is configured to manage the ledger information as a part of the upper layer ledger, the one or more nodes belonging to the upper layer group are configured to update the upper layer ledger in accordance with a transaction in the lower layer group, and the one or more nodes belonging to the lower layer group are configured not to update the lower layer ledger in accordance with a transaction in the upper layer group.

2. The system according to claim 1, wherein the ledger information comprises a chain ID indicating the lower layer ledger.

3. The system according to claim 1, wherein the ledger information comprises a hash value calculated from a block of the lower layer ledger.

4. The system according to claim 1, wherein the ledger information comprises a block height indicating a block number of the lower layer ledger.

5. The system according to claim 1, wherein each of the one or more nodes belonging to the upper layer group is configured to store the ledger information given by notification from the lower layer group in a transaction data part of a block of the upper layer ledger.

6. The system according to claim 1, wherein each of the one or more nodes belonging to the lower layer group is configured to store the ledger information given by notification from the upper layer group in a header part of a block of the lower layer ledger.

7. The system according to claim 5, wherein the one or more nodes belonging to the upper layer group are configured to update the upper layer ledger in accordance with a transaction in the upper layer group.

8. The system according to claim 5, wherein the one or more nodes belonging to the lower layer group are configured to update the lower layer ledger in accordance with a transaction in the lower layer group.

9. The system according to claim 1, wherein the one or more nodes belonging to the upper layer group are not configured to manage the lower layer ledger, and the one or more nodes belonging to the lower layer group are not configured to manage the upper layer ledger.

* * * * *